United States Patent
Sung

(10) Patent No.: US 9,143,201 B2
(45) Date of Patent: Sep. 22, 2015

(54) DATA RECEIVER FOR NEAR FIELD COMMUNICATION AND WIRELESS COMMUNICATION SYSTEM INCLUDING THE SAME

(71) Applicant: Samsung Electronics Co., Ltd., Suwon-Si, Gyeonggi-Do (KR)

(72) Inventor: Hyuk-Jun Sung, Seongnam-si (KR)

(73) Assignee: Samsung Elecronics Co., Ltd., Gyeonggi-do (KR)

( * ) Notice: Subject to any disclaimer, the term of this patent is extended or adjusted under 35 U.S.C. 154(b) by 92 days.

(21) Appl. No.: 13/940,378

(22) Filed: Jul. 12, 2013

(65) Prior Publication Data

US 2014/0017997 A1    Jan. 16, 2014

Related U.S. Application Data

(60) Provisional application No. 61/671,947, filed on Jul. 16, 2012.

(30) Foreign Application Priority Data

Oct. 26, 2012    (KR) .................. 10-2012-0120039

(51) Int. Cl.
    *H04B 5/00* (2006.01)
(52) U.S. Cl.
    CPC .................. *H04B 5/0031* (2013.01)
(58) Field of Classification Search
    CPC ...................................... H04L 29/06
    USPC .................................. 455/41.1, 41.2
    See application file for complete search history.

(56) References Cited

U.S. PATENT DOCUMENTS

| | | | |
|---|---|---|---|
| 6,172,609 B1 | 1/2001 | Lu et al. | |
| 6,970,448 B1 * | 11/2005 | Sparrell et al. | 370/347 |
| 8,824,606 B2 * | 9/2014 | Cheng et al. | 375/343 |
| 2005/0109841 A1 | 5/2005 | Ryan et al. | |
| 2006/0289646 A1 | 12/2006 | Shafer | |
| 2008/0224825 A1 | 9/2008 | Nystrom et al. | |
| 2010/0191870 A1 | 7/2010 | Qi et al. | |
| 2011/0206142 A1 | 8/2011 | Sung | |

\* cited by examiner

*Primary Examiner* — Tuan H Nguyen
(74) *Attorney, Agent, or Firm* — Harness, Dickey & Pierce, P.L.C.

(57) ABSTRACT

A data receiver for near field communication (NFC) includes an analog receiving unit and a digital processing unit. The analog receiving unit is configured to output one of received first data and modified received second data, according to an operation mode, the modified received second data being in-phase data and quadrature-phase data generated based on the received second data. The digital processing unit is configured to, determine a sampling characteristic of a first channel based on a first offset value, determine a sampling characteristic of a second channel based on a second offset value, detect a communication protocol of the received first data based on the first and second channels, and decode and store the received first data based on the detected communication protocol of the first data.

20 Claims, 16 Drawing Sheets

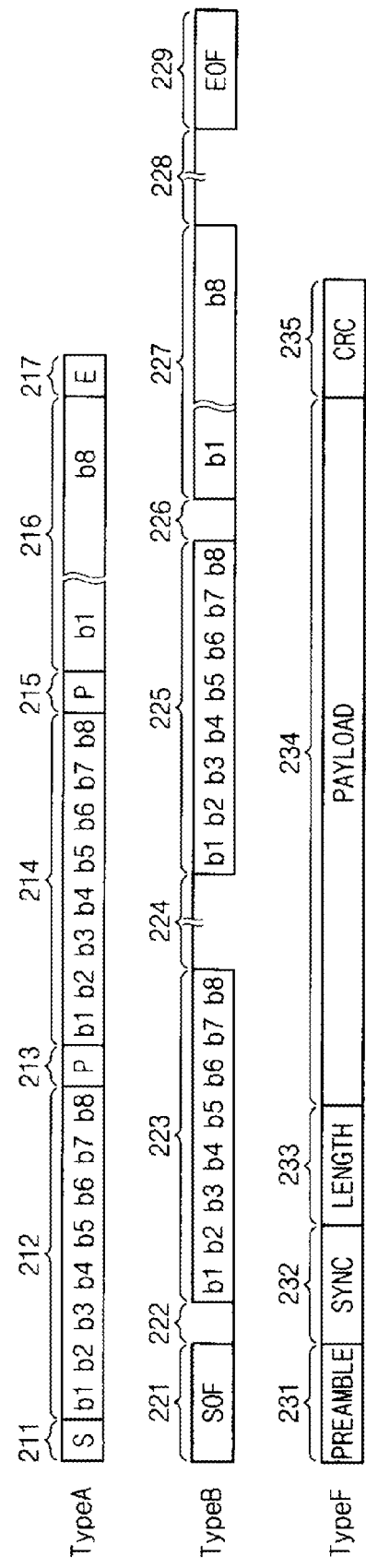

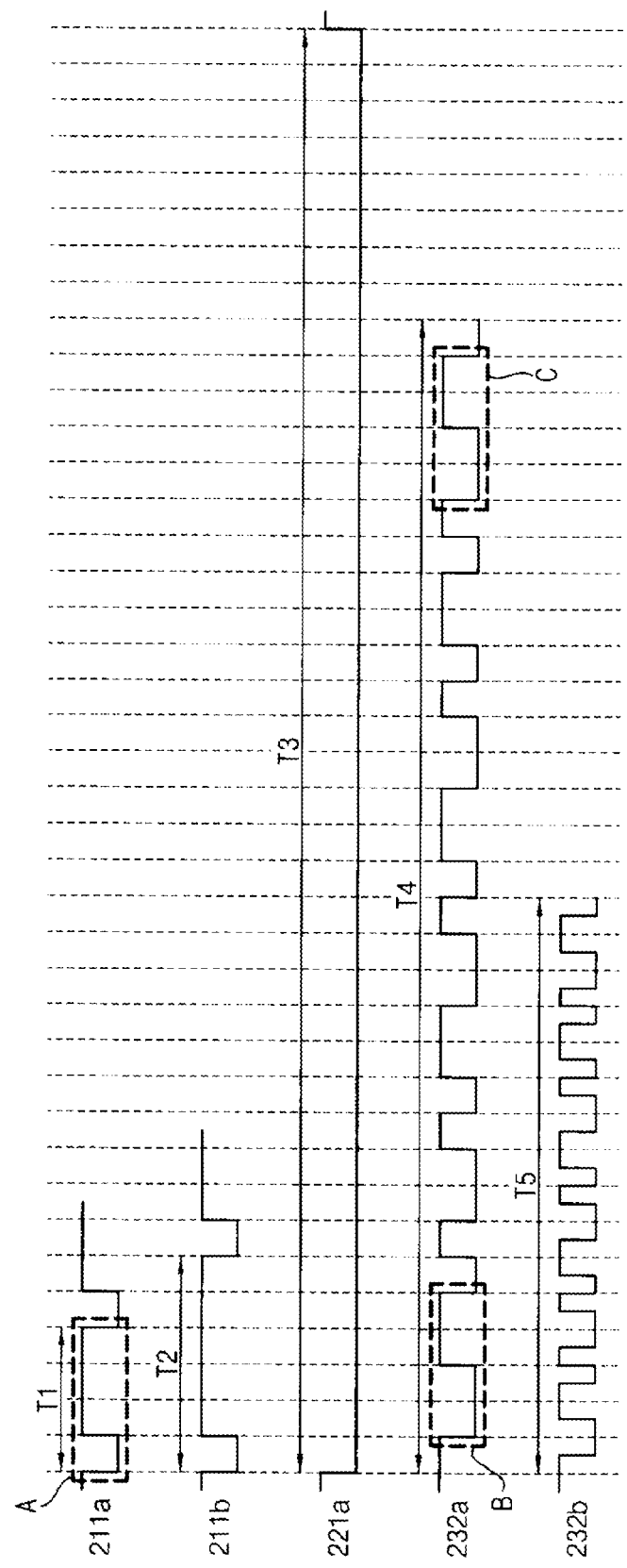

DATA RECEIVER FOR NEAR FIELD COMMUNICATION AND WIRELESS COMMUNICATION SYSTEM INCLUDING THE SAME

CROSS-REFERENCE TO RELATED APPLICATION

This U.S. non-provisional application claims priority under 35 USC §119 to U.S. Provisional Application No. 61/671,947 filed on Jul. 16, 2012 in the USPTO, and Korean Patent Application No. 2012-0120039, filed on Oct. 26, 2012, in the Korean Intellectual Property Office (KIPO), the contents of which are herein incorporated by reference in their entirety.

BACKGROUND

1. Technical Field

Example embodiments relate generally to a wireless communication technology, and more particularly to a data receiver and a wireless communication system including the data receiver.

2. Description of the Related Art

Recently, near filed communication (NFC), which is a type of wireless communication technology, has been extensively used. A wireless communication system employing the NFC can perform both data writing and data reading functions. In addition, since the communication distance is short, the wireless communication system employing the NFC may ensure high security and may be implemented at low cost. A data receiver for NFC may receive various types of data according to a communication protocol, and thus technologies to effectively detect the type of data received in the data receiver for NFC have been developed.

The conventional data receiver for NFC samples received data and detects communication protocols by using a single channel in a card mode. In this case, the waveforms of the received data may be distorted. Therefore, the conventional data receiver for NFC may erroneously detect the communication protocols of the received data based on the distorted waveforms and the data receiving performance may be degraded. For this reason, a method of detecting the communication protocol by varying the sampling characteristic of single channel has been suggested, but this method has the problem in that the detection speed is reduced.

SUMMARY

Some example embodiments provide a data receiver for NFC capable of rapidly and accurately detecting a type of received data.

Some example embodiments provide a wireless communication system including a data receiver for NFC capable of rapidly and accurately detecting a type of received data.

According to example embodiments, a data receiver for near field communication (NFC) includes an analog receiving unit and a digital processing unit. The analog receiving unit is configured to output one of received first data and modified received second data according to an operation mode, the modified received second data being in-phase data and quadrature-phase data generated based on the received second data. The digital processing unit determines a sampling characteristic of a first channel based on a first offset value, determines a sampling characteristic of a second channel based on a second offset value, detects a communication protocol of the received first data based on the first and second channels, and decodes and stores the received first data based on the detected communication protocol of the first data.

The communication protocol of the received first data may be detected based on the first channel when the received first data correspond to a first communication protocol. The communication protocol of the received first data may be detected based on the second channel when the received first data correspond to a second communication protocol. One of the first and second channels may be inactivated based on the communication protocol detecting operation.

The first communication protocol may be a TypeA 106 protocol or a TypeB 106 protocol, and the second communication protocol may be a TypeF 212 protocol or a TypeF 424 protocol.

The first and second offset values may be preset such that the TypeA 106 protocol is distinguished from the TypeF 212 protocol.

The first offset value may be greater than the second offset value.

The received first data may include a mode pattern and a data pattern, and the digital processing unit may detect the communication protocol of the received first data by analyzing the mode pattern using the first and second channels.

The mode pattern may correspond to a start bit when the received first data correspond to the TypeA 106 protocol, the mode pattern may correspond to a file start pattern when the received first data correspond to the TypeB 106 protocol, and the mode pattern may correspond to a sync pattern when the received first data correspond to the TypeF 212 protocol or the TypeF 424 protocol.

The digital processing unit may detect the communication protocol of the received first data by further analyzing 1 bit of the data pattern received after the start bit when the received first data corresponds to the TypeA 106 protocol.

The digital processing unit may include a first sampling block, a second sampling block and a decoding block. The first sampling block may generate a first detection signal and a first internal data signal based on the received first data and the first offset value when the received first data correspond to a first communication protocol in a first operation mode. The second sampling block may generate a second detection signal and a second internal data signal based on the received first data and the second offset value when the received first data correspond to a second communication protocol in the first operation mode. The decoding block may decode and store the received first data based on the first detection signal, the first internal data signal, the second detection signal and the second internal data signal in the first operation mode.

In an example embodiment, the digital processing unit may further include a selecting block and a third sampling block. The selecting block may provide one of the received first data or one of the in-phase data and the quadrature-phase data to the second sampling block according to the operation mode. The third sampling block may generate a third internal data signal based on another one of the in-phase data and the quadrature-phase data in a second operation mode. The second sampling block may generate a fourth internal data signal based on the one of the in-phase data and the quadrature-phase data in the second operation mode, and the decoding block may decode and store the second data based on the third internal data signal and the fourth internal data signal in the second operation mode.

In an example embodiment, the digital processing unit may further include a third sampling block and a fourth sampling block. The third sampling block may generate a third internal data signal based on one of the in-phase data and the quadrature-phase data in a second operation mode. The fourth sampling block may generate a fourth internal data signal based on another one of the in-phase data and the quadrature-phase data in the second operation mode. The decoding block may decode and store the second data based on the third internal data signal and the fourth internal data signal in the second operation mode.

The first sampling block may serve as the first channel and the second sampling block may serve as the second channel.

The first and second offset values may include priority information representing a priority of the communication protocol detecting operation with respect to the first and second channels. The communication protocol detecting operation may be performed based on one of the first and second channels having a higher priority when the received first data have detectable waveforms in both of the first and second channels.

The analog receiving unit may include a first receiving block and a second receiving block. The first receiving block may receive and output the first data. The second receiving block may output the in-phase data and the quadrature-phase data based on the second data.

According to example embodiments, a wireless communication system includes a first terminal and a second terminal. The first terminal transmits first data or second data according to an operation mode. The second terminal receives the first data or second data transmitted from the first terminal. The second terminal includes a data receiver for near field communication (NFC). The data receiver includes an analog receiving unit and a digital processing unit. The analog receiving unit is configured to output one of received first data and modified received second data according to an operation mode, the modified received second data being in-phase data and quadrature-phase data generated based on the received second data. The digital processing unit determines a sampling characteristic of a first channel based on a first offset value, determines a sampling characteristic of a second channel based on a second offset value, detects a communication protocol of the received first data based on the first and second channels, and decodes and stores the received first data based on the detected communication protocol of the first data.

At least one example embodiment relates to a data receiver.

In one example embodiment, the data receiver includes a digital processing unit including a first channel and a second channel, the first channel configured to receive first data, the second channel configured to receive second data, the second data being in-phase data and quadrature-phase data, the in-phase data being data that is in phase with incoming data received by an analog receiving unit and the quadrature-phase data being data that is 90 degrees out of phase with the incoming data. The digital processing unit may be configured to detect a communication protocol of the incoming data using the first channel and the second channel, and decode the incoming data based on the detected communication protocol.

In one example embodiment, the incoming data includes a mode pattern and a data pattern, and the digital processing unit is configured to the detect the communication protocol by analyzing the mode pattern using the first channel and the second channel.

In one example embodiment, the first channel is configured to generate first detection signals by sampling the first data at a frequency determined using a first offset and the second channel is configured to generate second detection signals by sampling one of the first data and the quadrature-phase data at a frequency determined using a second offset, and the digital processing unit further includes a decoding block configured to decode the incoming data based on the first detection signals and the second detection signals, the first offset being different than the second offset.

In one example embodiment, the digital processing unit is configured to deactivate one of the first and second channels that is not associated with the detected communication protocol.

In one example embodiment, the data receiver includes the analog receiving unit. The analog receiving unit may include a first receiving block configured to receive the incoming data and output the first data to the first channel and the second channel; and a second receiving block configured to receive the incoming data and output the in-phase data to a third channel and the quadrature-phase data to the second channel.

As described above, the data receiver for NFC according to example embodiments determines sampling characteristics of at least two channels based on at least two offset values different from each other and detects the communication protocol of received data by processing the received data at the substantially same time based on the least two channels. Therefore, the data receiver for NFC according to example embodiments can rapidly and accurately detect the communication protocol of the received data, so the data receiving performance can be improved in the auto-receiving operation.

In addition, the data receiver for NFC according to example embodiments is configured to perform the two-channel (or at least three-channel) detecting operation by using the sampling block included in a conventional data receiver for NFC, so that the data receiving performance can be improved without increasing the size.

BRIEF DESCRIPTION OF THE DRAWINGS

Illustrative, non-limiting example embodiments will be more clearly understood from the following detailed description taken in conjunction with the accompanying drawings.

FIGS. 2, 3, 4A and 4B are views to explain the operation of a data receiver for NFC according to example embodiments.

DETAILED DESCRIPTION OF THE EMBODIMENTS

Figure 1:
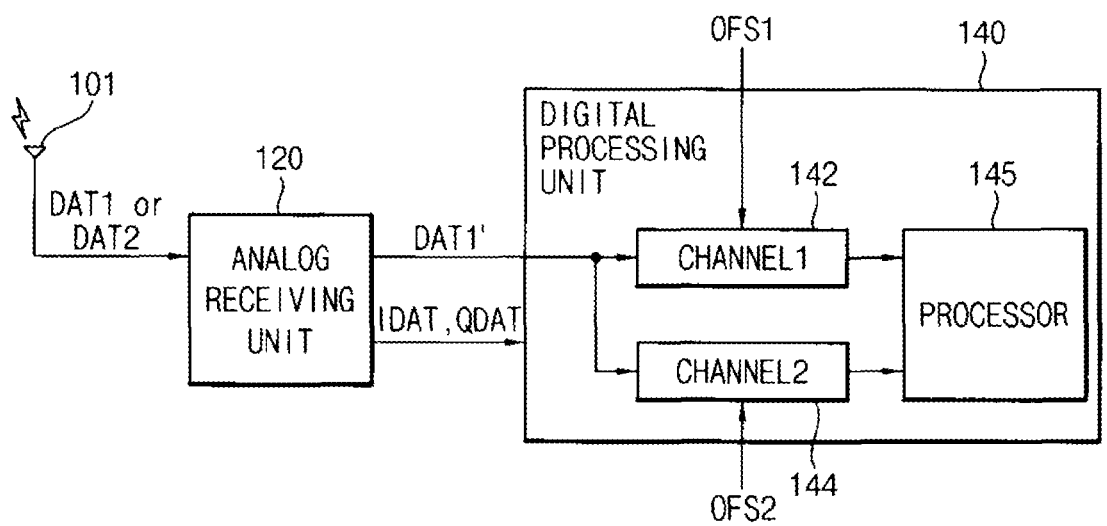
FIG. 1 is a block diagram illustrating a data receiver for NFC according to example embodiments.

Various example embodiments will be described more fully with reference to the accompanying drawings, in which example embodiments are shown. These inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which these inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a data receiver for NFC according to example embodiments.

The data receiver 100 for NFC shown in FIG. 1 may be included in a wireless communication system that transceives data based on the NFC scheme used in the wireless communication system. For instance, when NFC with ISO 14443 standard, the wireless communication system may include a reader and a card. In contrast, when NFC with ISO 18092 standard is applied then the wireless communication system may include an initiator and a target.

The data receiver 100 for NFC according to example embodiments may be included in a terminal of the wireless communication system. In a first operation mode (e.g., a card mode) where the terminal operates as the card (or the target), data may be received from the reader (or the initiator). In addition, in a second operation mode (e.g., a reader mode) where the terminal operates as the reader (or the initiator), data may be received from the card (or the target).

Hereinafter, example embodiments will be described while focusing on the operation of the data receiver 100 for NFC in the first operation mode where the terminal including the data receiver 100 for NFC operates as the card (or the target).

Referring to FIG. 1, the data receiver 100 for NFC includes an analog receiving unit 120 and a digital processing unit 140.

The analog receiving unit 120 provides data to the digital process unit 140 that is received through an antenna 101. The analog receiving unit 120 can receive and supply mutually different data according to the operation mode of the terminal including the data receiver 100 for NFC. For instance, in the first operation mode, the analog receiving unit 120 receives, via the antenna 101, incoming first data DAT1 from an external reader (not shown) and outputs received first data DAT1' based on the incoming first data DAT1. The data DAT1' output from the analog receiving unit 120 may be obtained by removing carrier waves from the incoming first data DAT1 and may be referred to as received first data. In the second operation mode, the analog receiving unit 120 receives, via the antenna 101, incoming second data DAT2 from an external card (not shown) and outputs in-phase data IDAT and quadrature-phase data QDAT based on the incoming second data DAT2. The in-phase data IDAT corresponds to in-phase components of the second data DAT2 and the quadrature-phase data QDAT corresponds to quadrature components of the incoming second data DAT2 (e.g., components 90 degrees out of phase with the rest of the incoming second data DAT2).

The digital processing unit 140 includes two channels 142 and 144 for processing the received first data DAT1' at substantially the same time and a processor 145 for processing and storing data output from the channels 142 and 144. The digital processing unit 140 determines the sampling characteristic of the first channel 142 based on a first offset value OFS1 and determines the sampling characteristic of the second channel 144 based on a second offset value OFS2. The digital processing unit 140 detects the communication protocols of the received first data DAT1' using the first and second channels 142 and 144, and decodes and stores the received first data DAT1' based on the detected communication protocols.

In one example embodiment, if the received first data DAT1' corresponds to a first communication protocol, the communication protocol of the received first data DAT1' may be detected using the first channel 142. If the received first data DAT1' corresponds to a second communication protocol, the communication protocol of the received first data DAT1' may be detected using the second channel 144. For instance, the communication protocol of the received first data DAT1' may be one of a TypeA 106 protocol, a TypeB 106 protocol, a TypeF 212 protocol and a TypeF 424 protocol. The first communication protocol may be the TypeA 106 protocol or the TypeB 106 protocol, and the second communication protocol may be one of the TypeF 212 protocol and the TypeF 424 protocol.

The first offset value OFS1 and the second offset value OFS2 may be such that during a protocol detecting operation, the received first data encoded with the TypeA 106 protocol can be distinguished from the received first data encoded with the TypeF 212 protocol, which will be described later with reference to FIGS. 2, 3, 4A, 4B and 5. One of the first and second channels 142 and 144 may be inactivated based on this communication protocol detecting operation, which will be described later with reference to FIG. 5.

In example embodiments, even though the first channel 142 and the second channel 144 may both detect the waveforms of the received first data DAT1', the communication protocol of the received first data DAT1' may be detected using the channel having the higher priority between two channels and the channel having the lower priority may be inactivated based on the communication protocol detecting operation.

The first offset value OFS1 and the second offset value OFS2 may be defined as offset values for the sampling time (or sampling frequency). For instance, if an initial sampling frequency for one sampling section in the first channel 142 is assumed to be X, a modified sampling frequency for one sampling section in the first channel 142 maybe modified as X+OFS1 after the sampling characteristic of the first channel 142 is determined based on the first offset value OFS1.

The data receiver 100 for NFC according to example embodiments includes at least the first channel 142 and the second channel 144 for processing the received first data DAT1', which are received in the first operation mode (e.g., the card mode), at substantially the same time. The data receiver 100 for NFC determines sampling characteristics of the two channels 142 and 144 based on two offset values OFS1 and OFS2 different from each other and detects the communication protocols of the received first data DAT1' using the two channels 142 and 144. For instance, the first communication protocol may be detected using the first channel 142 and the second communication protocol may be detected using the second channel 144.

In an auto-receiving operation, data packets are received and the communication protocols of the received data packets are detected at the substantially same time in the first operation mode. Therefore, the data receiver 100 for NFC can rapidly and accurately detect the communication protocols of the received first data DAT1' even if the waveforms of the received first data DAT1' are distorted, so the data receiving performance can be improved during the auto-receiving operation.

As will be described later with reference to FIGS. 8 to 12, the number of channels for processing the received first data DAT1' in the data receiver 100 for NFC according to example embodiments may be variously changed. In other words, the data receiver 100 for NFC according to example embodiments can sample the received first data DAT1' and can detect the communication protocol using a data receiver with different numbers of channels, for example, using a data receiver having at least three channels.

FIGS. 2, 3, 4A and 4B are views to explain the operation of the data receiver for NFC according to example embodiments.

Figure 4A:
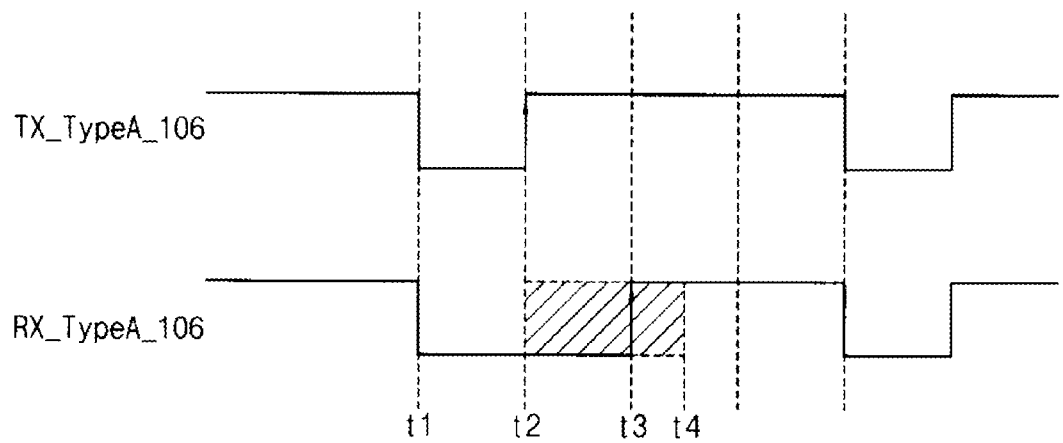
Figure 4B:
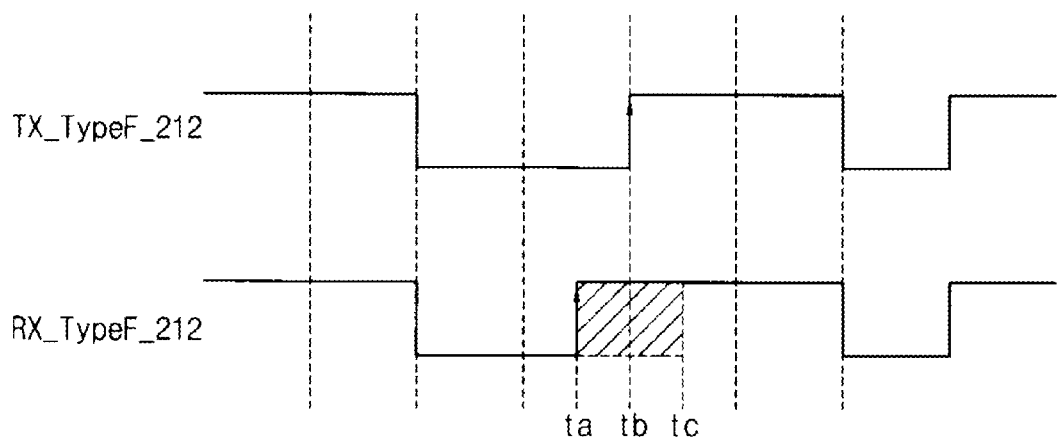

FIG. 2 is a view illustrating configurations of data packets of the received first data DAT1'. FIG. 3 is a view illustrating waveforms of mode patterns included in the data packets of FIG. 2. FIGS. 4A and 4B are views to explain the distortion of the waveforms of the mode patterns included in the received first data DAT1'.

Referring to FIGS. 1 and 2, "TypeA" represents the configuration of the data packet of the received first data DAT1' when the received first data DAT1' corresponds to the TypeA 106 protocol, "TypeB" represents the configuration of the data packet of the received first data DAT1' when the received first data DAT1' corresponds to the TypeB 106 protocol, and "TypeF" represents the configuration of the data packet of the received first data DAT1' when the received first data DAT1' corresponds to the TypeF 212 protocol or TypeF 424 protocol.

In one example embodiment, the received first data DAT1' may include a mode pattern and a data pattern. The mode pattern may include information related to the communication protocol of the received first data DAT1' and the data pattern may correspond to effective data of the received first data DAT1'.

If the received first data DAT1' corresponds to the TypeA 106 protocol, the data packet of the received first data DAT1' may include a start bit (S) 211, data patterns 212, 214 and 216, parity patterns 213 and 215 and an end bit 217. In this case, the mode pattern may correspond to the start bit 211 and the data pattern may correspond to the data patterns 212, 214 and 216.

If the received first data DAT1' corresponds to the TypeB 106 protocol, the data packet of the received first data DAT1' may include a file start pattern (SOF) 221, data patterns 223, 225 and 227, start sections 222 and 226, stop sections 224 and 228 and a file end pattern 229. In this case, the mode pattern may correspond to the file start pattern 221 and the data pattern may correspond to the data patterns 223, 225 and 227.

If the received first data DAT1' corresponds to the TypeF 212 protocol or TypeF 424 protocol, the data packet of the received first data DAT1' may include a preamble pattern 231, a sync pattern (SYNC) 232, a length pattern 233, a payload pattern 234 and a CRC pattern 235. In this case, the mode pattern may correspond to the sync pattern 232 and the data pattern may correspond to the payload pattern 234.

As shown in FIG. 2, since the received first data DAT1' includes the start bit 211, the file start pattern 221 or the sync pattern 232 as a mode pattern according to the communication protocol, the digital processing unit 140 can detect the communication protocol of the received first data DAT1' by analyzing the mode pattern by using the first and second channels 142 and 144.

Referring to FIGS. 1, 2 and 3, if the received first data DAT1' correspond to the TypeA 106 protocol and a first bit of the data pattern 212 received after the start bit 211 is '0', the received first data DAT1' may have a waveform 211a during a time T1. In this case, the time T1 may correspond to the start bit 211.

If the received first data DAT1' correspond to the TypeA 106 protocol and the first bit of the data pattern 212 received after the start bit 211 is '1', the received first data DAT1' may have a waveform 211b during a time T2. In this case, the time T2 may correspond to the start bit 211 and the first 1 bit of the data pattern 212.

If the received first data DAT1' correspond to the TypeB 106 protocol, the received first data DAT1' may have a waveform 221a during a time T3. In this case, the time T3 may correspond to the file start pattern 221.

If the received first data DAT1' correspond to the TypeF 212 protocol, the received first data DAT1' may have a waveform 232a during a time T4. In this case, the time T4 may correspond to the sync pattern 232.

If the received first data DAT1' correspond to the TypeF 424 protocol, the received first data DAT1' may have a waveform 232b during a time T5. In this case, the time T5 may correspond to the sync pattern 232.

As shown in FIG. 3, the waveforms 211a and 211b of the mode pattern of the TypeA 106 protocol may not be readily distinguished from the waveform 232a of the mode pattern of the TypeF 212 protocol. Thus, if the received first data DAT1' correspond to the TypeA 106 protocol, the start bit 211 is included in the mode pattern and the first 1 bit of the data pattern 212 received after the start bit 211 may be further included in the mode pattern. At this time, the waveforms 211a and 211b of the mode pattern of the TypeA 106 protocol may vary depending on the value of the first bit of the data pattern 212 received after the start bit 211, and the data processing unit 140 may detect the communication protocol of the received first data DAT1' by analyzing the first bit of the data pattern 212 received after the start bit 211.

Referring to FIGS. 1 and 4A, a waveform TX_TypeA__106 of the mode pattern of the data transmitted from an external reader (not shown) by the TypeA 106 protocol in the first operation mode is substantially identical to the waveform 211a of the mode pattern shown in FIG. 3. However, a waveform RX_TypeA__106 of the mode pattern of the data corresponding to the TypeA 106 protocol and received in the data receiver 100 for NFC in the first operation mode may be distorted. For instance, a pause section (e.g., from time t1 to time t2) of the start bit may be widened and a rising edge located at the time t2 may be located between the time t2 and time t4. If the rising edge is located at the time t3, this distortion may cause the waveform RX_TypeA__106 of the received mode pattern to be substantially identical to a portion (e.g., B or C in FIG. 3) of the waveform 232a of the mode pattern of the TypeF 212 protocol shown in FIG. 3. In this case, the data receiving error may occur by erroneously determining the data corresponding to the TypeA 106 protocol as to the data corresponding to the TypeF 212 protocol.

Referring to FIGS. 1 and 4B, a waveform TX_TypeF__212 of the mode pattern of the data transmitted from an external reader (not shown) by the TypeF 212 protocol in the first operation mode is substantially identical to a portion (e.g., B or C in FIG. 3) of the waveform 232a of the mode pattern shown in FIG. 3. However, a waveform RX_TypeF__212 of the mode pattern of the data corresponding to the TypeF 212 protocol and received in the data receiver 100 for NFC in the first operation mode may be distorted. For instance, a rising edge located at a time tb may be located between a time ta and a time tc. If the rising edge is located at the time ta, this distortion may cause the waveform RX_TypeF__212 of the received mode pattern to be similar to a portion (e.g., A in FIG. 3) of the waveform 211a of the mode pattern of the TypeA 106 protocol shown in FIG. 3. In this case, the data receiving error may occur by erroneously determining the data corresponding to the TypeF 212 protocol as to the data corresponding to the TypeA 106 protocol.

To mitigate the aforementioned erroneous determinations, the data receiver 100 for NFC according to example embodiments detects the communication protocol of the received first data DAT1' having mutually different sampling characteristics by using two channels 142 and 144. Therefore, the data corresponding to the TypeA 106 protocol may not be erroneously determined as to the data corresponding to the TypeF 212 protocol and/or the data corresponding to the TypeF 212 protocol may not be erroneously determined as to the data corresponding to the TypeA 106 protocol.

Figure 5:
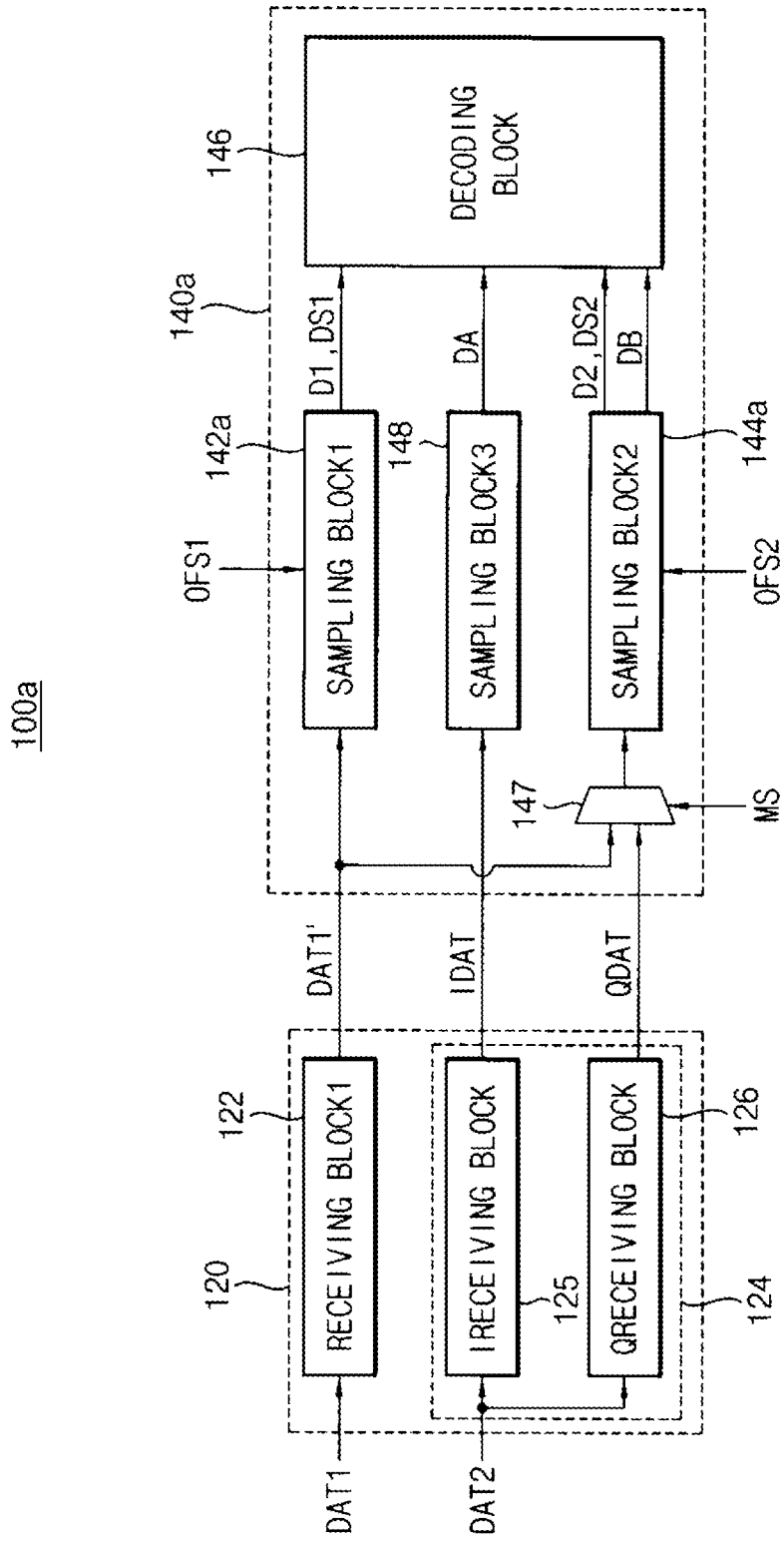
FIG. 5 is a block diagram illustrating an example of the data receiver for NFC shown in FIG. 1.

FIG. 5 is a block diagram illustrating an example of the data receiver for NFC shown in FIG. 1.

Referring to FIG. 5, the data receiver 100a for NFC includes the analog receiving unit 120 and a digital processing unit 140a.

The analog receiving unit 120 may include a first receiving block 122 and a second receiving block 124.

In the first operation mode, the first receiving block 122 may receive the first data DAT1 from an external reader (not shown) and may output the received first data DAT1' based on the first data DAT1. In the second operation mode, the second receiving block 124 may receive the second data DAT2 from an external card (not shown) and output the in-phase data IDAT and the quadrature-phase data QDAT based on the second data DAT2. The second receiving block 124 may include an in-phase receiving block 125 that generates the in-phase data IDAT based on the second data DAT2 and a quadrature receiving block 126 that generates the quadrature-phase data QDAT based on the second data DAT2.

The digital processing unit 140a may include a first sampling block 142a, a second sampling block 144a, and a decoding block 146, and may further include a selecting block 147 and a third sampling block 148.

If the received first data DAT1' correspond to the first communication protocol in the first operation mode, the first sampling block 142a may generate a first detection signal DS1 and a first internal data signal D1 based on the received first data DAT1' and the first offset value OFS1. The first detection signal DS1 may include information related to the communication protocol of the received first data DAT1' and the first internal data signal D1 may include information related to effective data of the received first data DAT1'. For instance, if the received first data DAT1' corresponds to the TypeA 106 protocol, since the communication protocol of the received first data DAT1' is detected by further analyzing the first 1 bit of the data pattern 212 (see FIG. 3) received after the start bit 211 (see FIG. 3) as described above with reference to FIG. 3, the first internal data signal D1 may include logic level information of the first 1 bit of the data pattern 212 (see FIG. 3), coding information (e.g., miller coding) of the received first data DAT1' and degrading information about over sampling of the received first data DAT1'. If the received first data DAT1' corresponds to the TypeB 106 protocol, the first internal data signal D1 may include coding information (e.g., NRZ (Nonreturn-to-Zero) coding) of the received first data DAT1' and degrading information about over sampling of the received first data DAT1'.

The selecting block 147 may provide one of the received first data DAT1' and the quadrature-phase data QDAT to the second sampling block 144a based on a mode selection signal MS (in other words, based on the operation mode). For instance, the selecting block 147 may provide the received first data DAT1' to the second sampling block 144a in the first operation mode and may provide the quadrature-phase data QDAT to the second sampling block 144a in the second operation mode.

If the received first data DAT1' corresponds to the second communication protocol in the first operation mode, the second sampling block 144a may generate a second detection signal DS2 and a second internal data signal D2 based on the received first data DAT1' and the second offset value OFS2. The second detection signal DS2 may include information related to the communication protocol of the received first data DAT1' and the second internal data signal D2 may include information related to effective data of the received first data DAT1'. For instance, if the received first data DAT1' corresponds to the TypeF 212 protocol or the TypeF 424 protocol, the second internal data signal D2 may include coding information (e.g., Manchester coding) of the received first data DAT1' and degrading information about over sampling of the received first data DAT1'.

The decoding block 146 may decode and store the received first data DAT1' based on the first detection signal DS1, the first internal data signal D1, the second detection signal DS2 and the second internal data signal D2 in the first operation mode. For instance, if the received first data DAT1' corresponds to the TypeA 106 protocol or the TypeB 106 protocol, the decoding block 146 may decode and store the received first data DAT1' based on the first detection signal DS1 and the first internal data signal D1. In addition, if the received first data DAT1' corresponds to the TypeF 212 protocol or TypeF 424 protocol, the decoding block 146 may decode and store the received first data DAT1' based on the second detection signal DS2 and the second internal data signal D2.

As described above, the first sampling block 142*a* may be activated in the first operation mode to serve as the first channel 142 (see FIG. 1) and the second sampling block 144*a* may be activated in the first operation mode to serve as the second channel 144 (see FIG. 1). The decoding block 146 may correspond to the processor 145 shown in FIG. 1.

In this manner, when the communication protocol detection operation is performed in the first operation mode, both of the first and second sampling blocks 142*a* and 144*a* may be activated. However, when the data are received based on the result of the communication protocol detecting operation after the communication protocol detecting operation has been performed in the first operation mode, one of the first and second sampling blocks 142*a* and 144*a* may be inactivated. For instance, if the first communication protocol is detected, the second sampling block 144*a* is inactivated so that the second detection signal DS2 and the second internal data signal D2 may not be generated, but the first sampling block 142*a* may generate the first detection signal DS1 and the first internal data signal D1 to provide the first detection signal DS1 and the first internal data signal D1 to the decoding block 146. In addition, if the second communication protocol is detected, the first sampling block 142*a* is inactivated so that the first detection signal DS1 and the first internal data signal D1 may not be generated, but the second sampling block 144*a* may generate the second detection signal DS2 and the second internal data signal D2 to provide the second detection signal DS2 and the second internal data signal D2 to the decoding block 146.

In one example embodiment, the first offset value OFS1 may be greater than the second offset value OFS2. For instance, the first offset value OFS1 may be set to '0xff' and the second offset value OFS2 may be set to '0x44'. In this case, the TypeA 106 protocol or the TypeB 106 protocol may be normally detected in the first sampling block 142*a* (e.g., the first channel), and the TypeF 212 protocol and TypeF 424 protocol may not be detected in the first sampling block 142*a*. In addition, the TypeF 212 protocol or TypeF 424 protocol may be normally detected in the second sampling block 144*a* (e.g., the second channel), and the TypeA 106 protocol and the TypeB 106 protocol may not be detected in the second sampling block 144*a*.

In one example embodiment, the first and second offset values OFS1 and OFS2 may further include priority information representing the priority of the communication protocol detecting operation with respect to the first and second channels. If the received first data DAT1' has detectable waveforms in both of the first and second channels, the communication protocol detecting operation may be performed based on one of the first and second channels having the higher priority. For instance, the first and second offset values OFS1 and OFS2 may be preset such that the first channel (e.g., the first sampling block 142*a*) has the priority higher than the priority of the second channel (e.g., the second sampling block 144*a*). If the received first data DAT1' correspond to the TypeA 106 protocol, the TypeA 106 protocol may be detected in both of the first and second channels depending on the length of the pause section of the start bit. In this case, the communication protocol of the received first data DAT1' may be detected based on the first channel (e.g., first sampling block 142*a*) having the higher priority.

In one example embodiment, the first and second offset values OFS1 and OFS2 may vary depending on communication environment of the wireless communication system including the data receiver 100*a* for NFC.

In the second operation mode, the first sampling block 142*a* may be inactivated, and the second and third sampling blocks 144*a* and 148*a* may be activated. The second sampling block 144*a* may be activated in both of the first and second operation modes.

In the second operation mode, the second sampling block 144*a* may generate a fourth internal data signal DB based on the quadrature-phase data QDAT. In addition, in the second operation mode, the third sampling block 148 may generate a third internal data signal DA based on the in-phase data IDAT. The decoding block 146 may decode and store the second data DAT2 based on the third and fourth internal data signals DA and DB in the second operation mode.

According to example embodiments, the data receiver 100*a* for NFC may consecutively receive a plurality of data packets. In general, the data packets are consecutively transmitted through the same communication protocol, so the data receiver 100*a* for NFC may perform the communication protocol detection operation only for the first-transmitted data packet from among the data packets consecutively transmitted. For instance, if the first-transmitted data packet is determined as to correspond to the TypeA 106 protocol, the data receiver 100*a* for NFC may select the first channel (e.g., the first sampling block 142*a*) to perform the data receiving operation by using only the first channel with respect to the data packets consecutively transmitted.

Figure 6A:
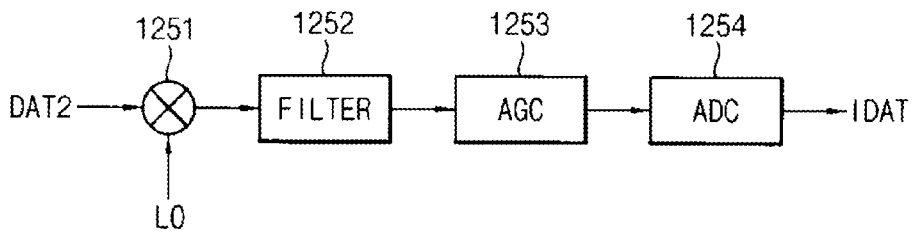
FIG. 6A is a block diagram illustrating an example of an in-phase receiving block included in the data receiver for NFC shown in FIG. 5.

FIG. 6A is a block diagram illustrating an example of an in-phase receiving block included in the data receiver for NFC shown in FIG. 5.

Referring to FIG. 6A, the in-phase receiving block 125 may include a mixer 1251, a filter 1252, an auto gain controller (AGC) 1253, and an analog-to-digital converter (ADC) 1254.

The mixer 1251 may mix the second data DAT2 with a local oscillating signal LO. The filter 1252 may filter an output signal of the mixer 1251. The AGC 1253 may control a gain of the output signal of the filter 1252. The ADC 1254 may generate the in-phase data IDAT by performing the analog-to-digital conversion with respect to the output signal of the AGC 1253.

Although not shown in the drawing, the quadrature receiving block 126 may have the same configuration as the configuration of the in-phase receiving block 125 shown in FIG. 6*a*. In other words, the quadrature receiving block 126 may include a mixer, a filter, an AGC and an ADC and may generate the quadrature-phase data QDAT by processing the second data DAT2 in the phase different from that of the in-phase receiving block 125.

Figure 6B:
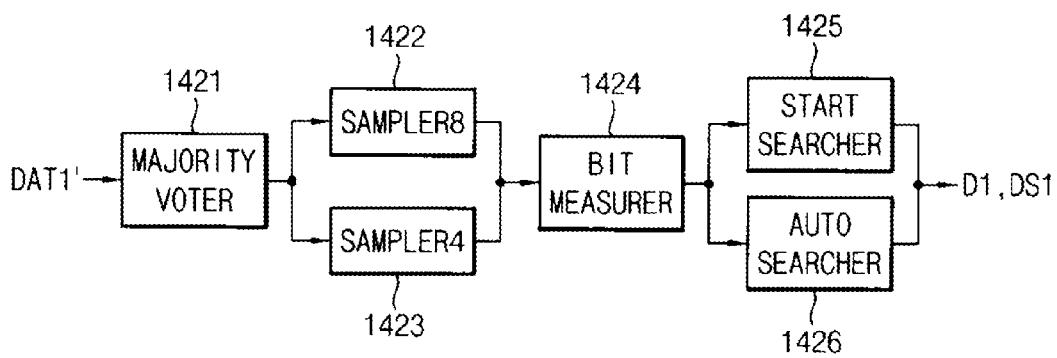
FIG. 6B is a block diagram illustrating an example of a first sampling block included in the data receiver for NFC shown in FIG. 5.

FIG. 6B is a block diagram illustrating an example of a first sampling block included in the data receiver for NFC shown in FIG. 5.

Referring to FIG. 6B, the first sampling block 142*a* may include a majority voter 1421, samplers 1422 and 1423, a bit measurer 1424, a start searcher 1425, and an auto searcher 1426.

The majority voter 1421 may perform the voting operation with respect to the received first data DAT1'. The samplers 1422 and 1423 may sample an output signal of the majority voter 1421. The bit measurer 1424 may perform the bit measuring operation with respect to output signals of the samplers 1422 and 1423. The start searcher 1425 may be activated in the normal receiving operation and may generate the first detection signal DS1 and the first internal data signal D1 by analyzing the mode pattern and the data pattern. The auto searcher 1426 may be activated in the auto receiving operation and may generate the first detection signal DS1 and the first internal data signal D1 by analyzing the mode pattern and the data pattern.

Figure 6C:
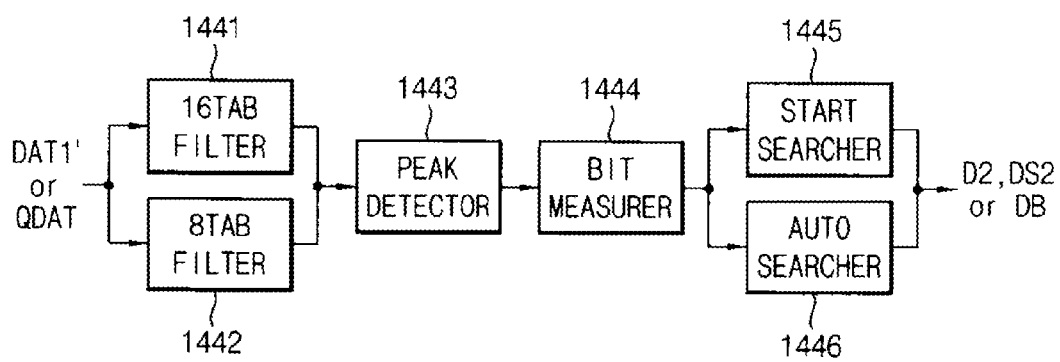
FIG. 6C is a block diagram illustrating an example of a second sampling block included in the data receiver for NFC shown in FIG. 5.

FIG. 6C is a block diagram illustrating an example of a second sampling block included in the data receiver for NFC shown in FIG. 5.

Referring to FIG. 6C, the second sampling block 144a may include filters 1441 and 1442, a peak detector 1443, a bit measurer 1444, a start searcher 1445, and an auto searcher 1446.

The filters 1441 and 1442 may filter the received first data DAT1' or the quadrature-phase data QDAT according to the operation mode. The peak detector 1443 may perform the peak detection operation with respect to output signals of the filters 1441 and 1442. The bit measurer 1424 may perform the bit measuring operation with respect to the output signal of the peak detector 1443. The start searcher 1425 may be activated in the normal receiving operation and may generate the second detection signal DS2 and the second internal data signal D2 or the fourth internal data signal DB according to the operation mode by analyzing the mode pattern and the data pattern. The auto searcher 1426 may be activated in the auto receiving operation and may generate the second detection signal DS2 and the second internal data signal D2 or the fourth internal data signal DB according to the operation mode by analyzing the mode pattern and the data pattern.

Although not shown in the drawing, the third sampling block 148 may have the same configuration as that of the second sampling block 144a shown in FIG. 6C. In other words, the third sampling block 148 may include filters, a peak detector, a beat measurer, a start searcher and an auto searcher.

Figure 7:
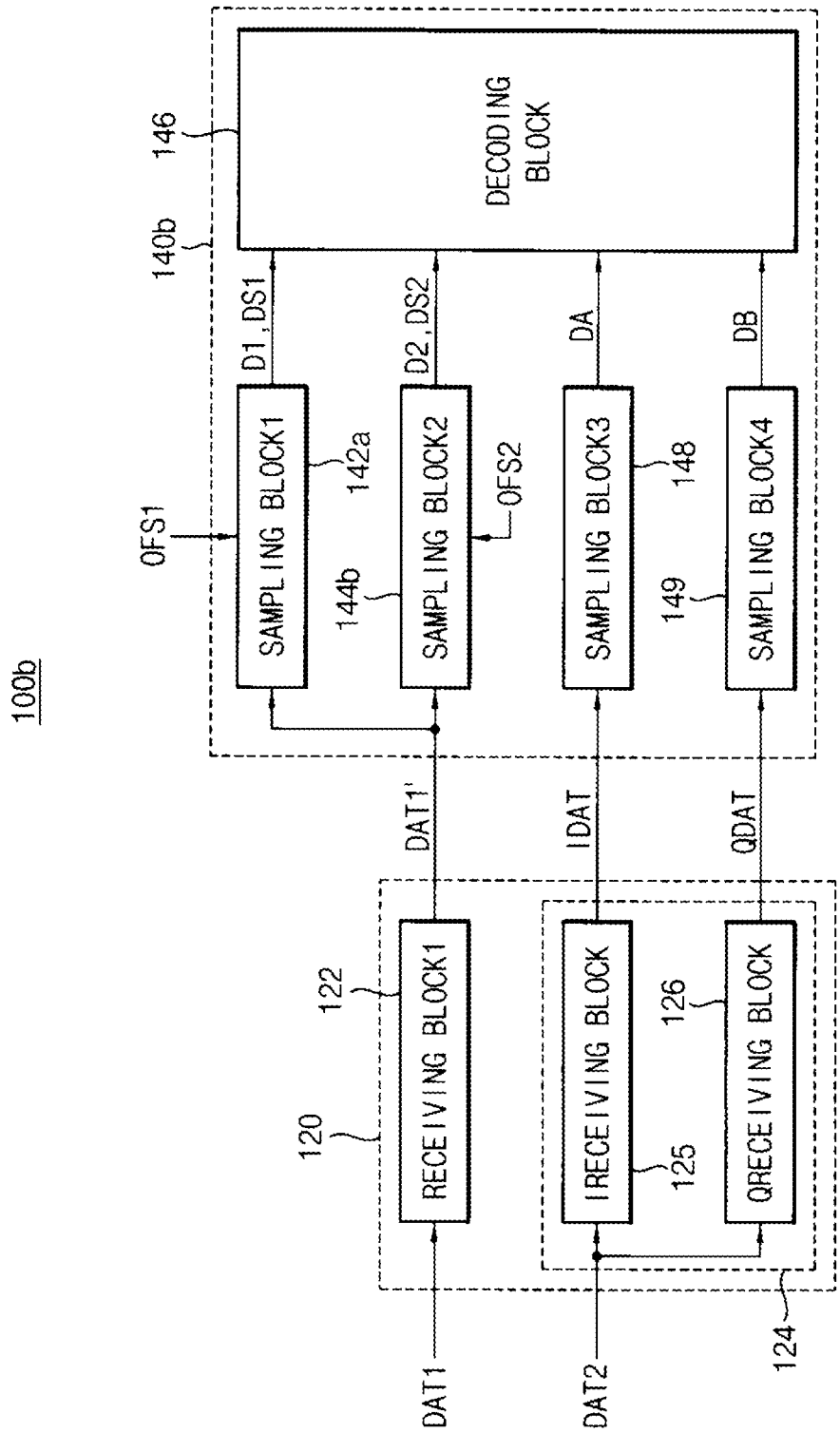
FIG. 7 is a block diagram illustrating another example of the data receiver for NFC shown in FIG. 1.

FIG. 7 is a block diagram illustrating another example of the data receiver for NFC shown in FIG. 1.

Referring to FIG. 7, the data receiver 100b for NFC includes the analog receiving unit 120 and a digital processing unit 140b.

The analog receiving unit 120 may include the first receiving block 122 that outputs the received first data DAT1' based on the first data DAT1 and the second receiving block 124 that outputs the in-phase data IDAT and quadrature-phase data QDAT based on the second data DAT2. The second receiving block 124 may include the in-phase receiving block 125 and the quadrature receiving block 126.

The digital processing unit 140b may include a first sampling block 142a, a second sampling block 144b, and a decoding block 146, and may further include a third sampling block 148 and a fourth sampling block 149.

If the received first data DAT1' correspond to the first communication protocol in the first operation mode, the first sampling block 142a may generate a first detection signal DS1 and a first internal data signal D1 based on the received first data DAT1' and the first offset value OFS1. If the received first data DAT1' correspond to the second communication protocol in the first operation mode, the second sampling block 144b may generate a second detection signal DS2 and a second internal data signal D2 based on the received first data DAT1' and the second offset value OFS2. The decoding block 146 may decode and store the received first data DAT1' based on the first detection signal DS1 the first internal data signal D1, the second detection signal DS2 and the second internal data signal D2 in the first operation mode. The first and second sampling blocks 142a and 144b may have the same configuration as that of the sampling blocks shown in FIG. 6B.

In the first operation mode, the third sampling block 148 and the fourth sampling block 149 are inactivated and one of the first and second sampling blocks 142a and 144b may be inactivated according to the result of the communication protocol detecting operation.

In the second operation mode, the third sampling block 148 may generate a third internal data signal DA based on the in-phase data IDAT and the fourth sampling block 149 may generate a fourth internal data signal DB based on the quadrature-phase data QDAT. The decoding block 146 may decode and store the second data DAT2 based on the third and fourth internal data signals DA and DB in the second operation mode. The third and fourth sampling blocks 148 and 149 may have the configuration similar to that of the sampling blocks shown in FIG. 6C. In the second operation mode, the first sampling block 142a and the second sampling block 144b may be inactivated The data receiver 100b for NFC shown in FIG. 7 may be substantially identical to the data receiver 100a for NFC shown in FIG. 5 except that the selecting block 147 (see FIG. 5) is omitted and the second sampling block 144b is separately provided, that is, the second sampling block 144a (see FIG. 5) is divided into the second sampling block 144b and the fourth sampling block 148.

Figure 8:
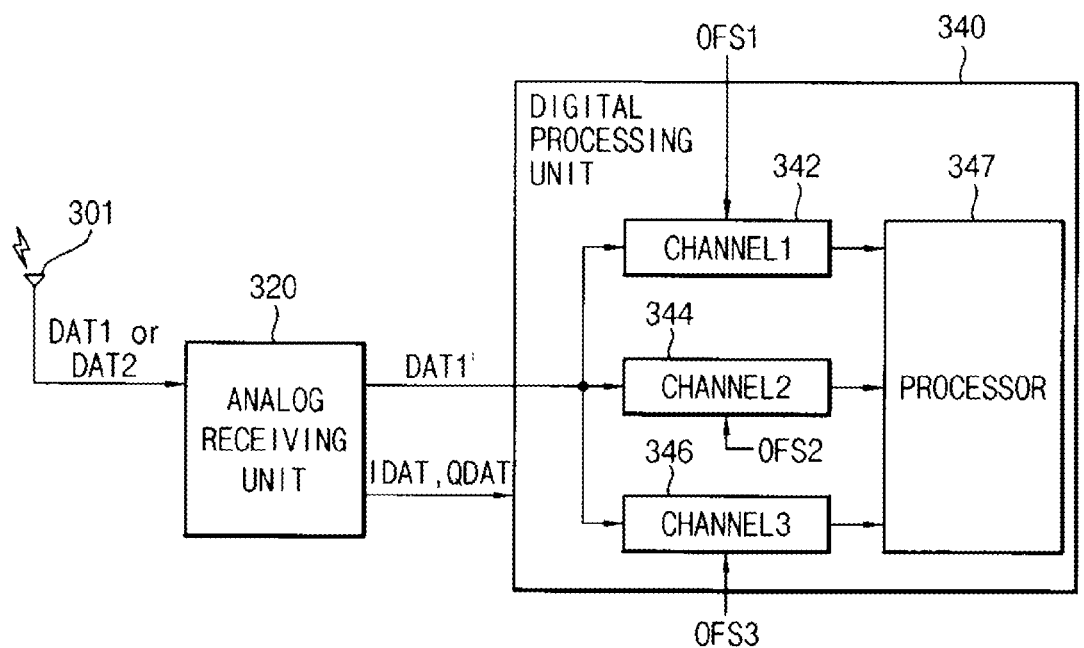
FIG. 8 is a block diagram illustrating a data receiver for NFC according to example embodiments.

FIG. 8 is a block diagram illustrating a data receiver for NFC according to example embodiments.

Referring to FIG. 8, the data receiver 300 for NFC includes an analog receiving unit 320 and a digital processing unit 340.

The analog receiving unit 320 provides data received through an antenna 301. In the first operation mode, the analog receiving unit 320 may output received first data DAT1' based on first data DAT1. In the second operation mode, the analog receiving unit 320 may output in-phase data DAT and quadrature-phase data QDAT based on second data DAT2.

The digital processing unit 340 includes three channels 342, 344 and 346 to process the received first data DAT1' at substantially the same time and a processor 347 for processing and storing outputs of the channels 342, 344 and 346. The digital processing unit 340 determines the sampling characteristic of the first channel 342 based on the first offset value OFS1, the sampling characteristic of the second channel 344 based on the second offset value OFS2, and the sampling characteristic of the third channel 346 based on the third offset value OFS3. The digital processing unit 340 detects the communication protocol of the received first data DAT1' based on the first to third channels 342, 344 and 346 and decodes and stores the received first data DAT1' based on the detected communication protocol. Only one of the first to third channels 342, 344 and 346 may be activated based on the result of the communication protocol detecting operation and the communication protocol of the received first data DAT1' may be detected based on the channel having the higher priority when at least two of the first to third channels 342, 344 and 346 have the detectable waveforms.

Figure 9:
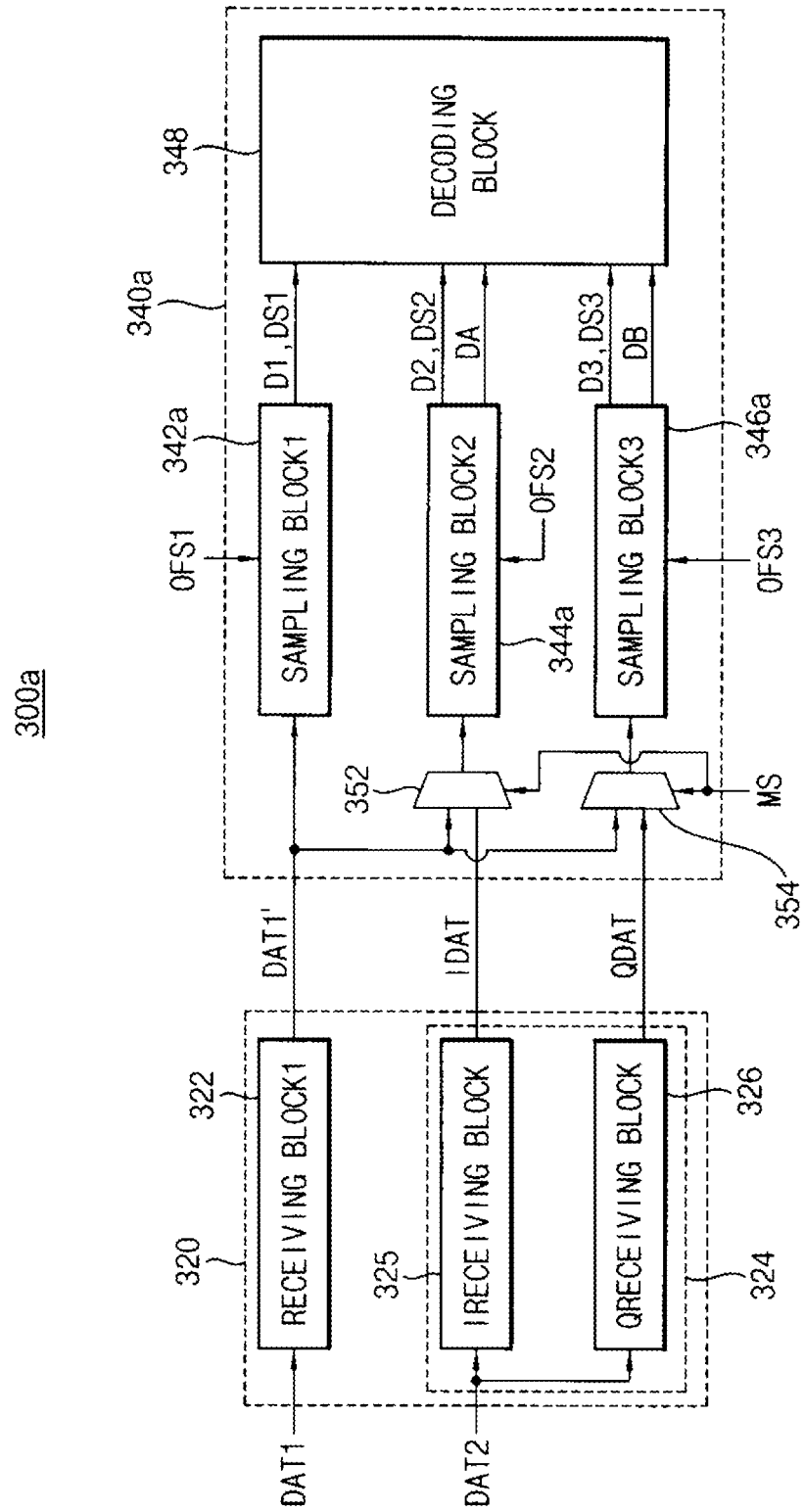
FIGS. 9, 10 and 11 are block diagrams illustrating examples of the data receiver for NFC shown in FIG. 8.
Figure 10:
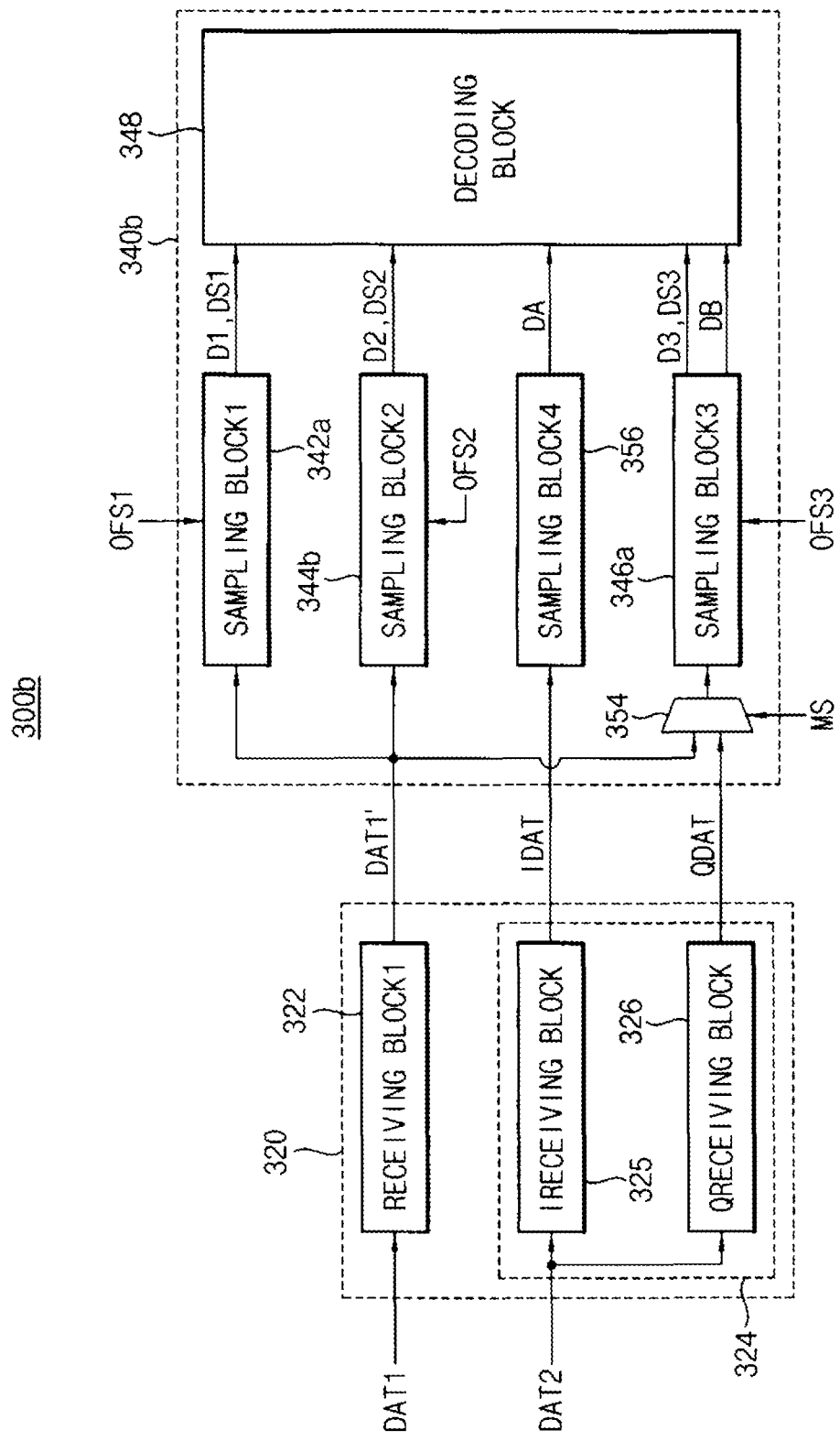
Figure 11:
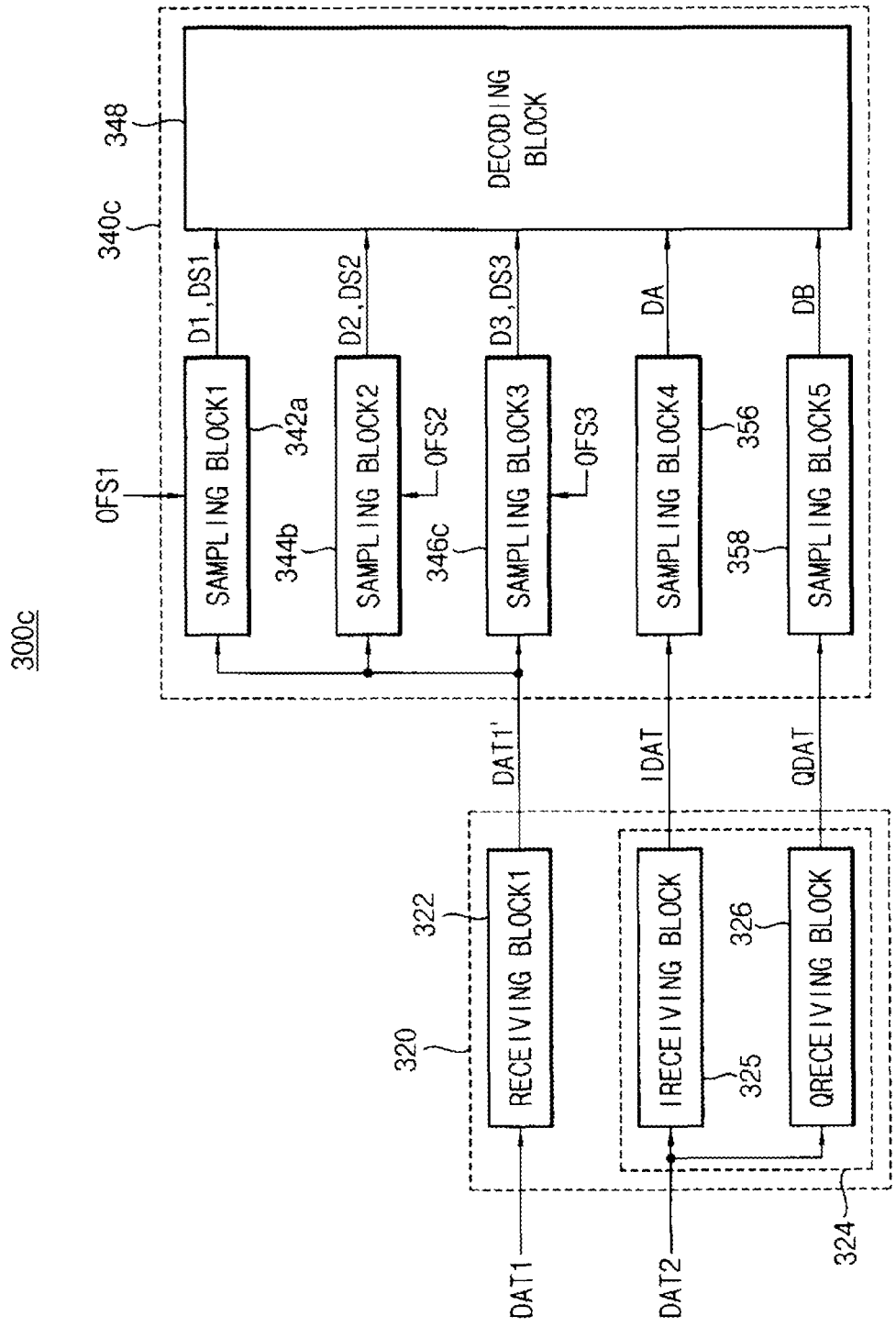

FIGS. 9, 10 and 11 are block diagrams illustrating examples of the data receiver for NFC shown in FIG. 8.

Referring to FIG. 9, the data receiver 300a for NFC includes the analog receiving unit 320 and the digital processing unit 340a.

The analog receiving unit 320 includes a first receiving block 322 and a second receiving block 324, and the second receiving block 324 may have an in-phase receiving block 325 and a quadrature receiving block 326. The first receiving block 322, the in-phase receiving block 325 and the quadrature receiving block 326 may be substantially identical to the first receiving block 122, the in-phase receiving block 125 and the quadrature receiving block 126 shown in FIG. 5, respectively.

The digital processing unit 340a includes a first sampling block 342a, a second sampling block 344a, a third sampling block 346a and a decoding block 348 and may further include selecting blocks 352 and 354.

If the received first data DAT1' correspond to the first communication protocol in the first operation mode, the first sampling block 342a may generate a first detection signal DS1 and a first internal data signal D1 based on the received first data DAT1' and the first offset value OFS1. The first sampling block 342a may correspond to the first channel 342 (see FIG. 8) and may have configuration similar to that of the sampling block shown in FIG. 6B.

The selecting blocks 352 and 354 may provide one of the received first data DAT1' or the in-phase data IDAT and the quadrature-phase data QDAT to the second sampling block 344a and the third sampling block 346a, respectively, based on a mode selection signal MS (that is, based on the operation mode). For instance, the selecting block 352 may provide the received first data DAT1' to the second sampling block 344a in the first operation mode and may provide the in-phase data IDAT to the second sampling block 344a in the second operation mode. The selecting block 354 may provide the received first data DAT1' to the third sampling block 346a in the first operation mode and may provide the quadrature-phase data QDAT to the third sampling block 346a in the second operation mode.

If the received first data DAT1' correspond to the second communication protocol in the first operation mode, the second sampling block 344a may generate a second detection signal DS2 and a second internal data signal D2 based on the received first data DAT1' and the second offset value OFS2. If the received first data DAT1' correspond to the third communication protocol in the first operation mode, the third sampling block 346a may generate a third detection signal DS3 and a third internal data signal D3 based on the received first data DAT1' and the third offset value OFS3. The second and third sampling blocks 344a and 346a may correspond to the second and third channels 344 and 346 (see FIG. 8), respectively, and may have configuration similar to that of the sampling block shown in FIG. 6c.

The decoding block 348 may decode and store the received first data DAT1' based on the first detection signal DS1, the first internal data signal D1, the second detection signal DS2, the second internal data signal D2, the third detection signal DS3 and the third internal data signal D3 in the first operation mode. The decoding block 348 may correspond to the processor 347 shown in FIG. 8.

In the second operation mode, the second sampling block 344a may generate a fourth internal data signal DA based on the in-phase data IDAT and the third sampling block 346a may generate a fifth internal data signal DB based on the quadrature-phase data QDAT. The decoding block 348 may decode and store the second data DAT2 based on the fourth internal data signal DA and the fifth internal data signal DB in the second operation mode.

The data receiver 300a for NFC shown in FIG. 9 includes the selecting blocks 352 and 354 to perform the three-channel detecting operation (e.g., communication protocol detecting operation using the first to third sampling blocks 342a, 344a and 346a) in the first operation mode, so the data receiving performance can be improved without increasing the size.

Referring to FIG. 10, the data receiver 300b for NFC includes the analog receiving unit 320 and a digital processing unit 340b.

The data receiver 300b for NFC shown in FIG. 10 may be substantially identical to the data receiver 300a for NFC shown in FIG. 9 except that the selecting block 352 (see FIG. 9) is omitted and the second sampling block 344b is separately provided, that is, the second sampling block 344a (see FIG. 9) is divided into a second sampling block 344b and a fourth sampling block 356.

Referring to FIG. 11, the data receiver 300c for NFC includes an analog receiving unit 320 and a digital processing unit 340c.

The data receiver 300c for NFC shown in FIG. 11 may be substantially identical to the data receiver 300a for NFC shown in FIG. 9 except that the selecting blocks 352 and 354 (see FIG. 9) are omitted and the second and third sampling blocks 344b and 346c are separately provided, that is, the second sampling block 344a (see FIG. 9) is divided into the second sampling block 344b and a fourth sampling block 356 and the third sampling block 346a (see FIG. 9) is divided into a third sampling block 344c and a fifth sampling block 358.

Figure 12:
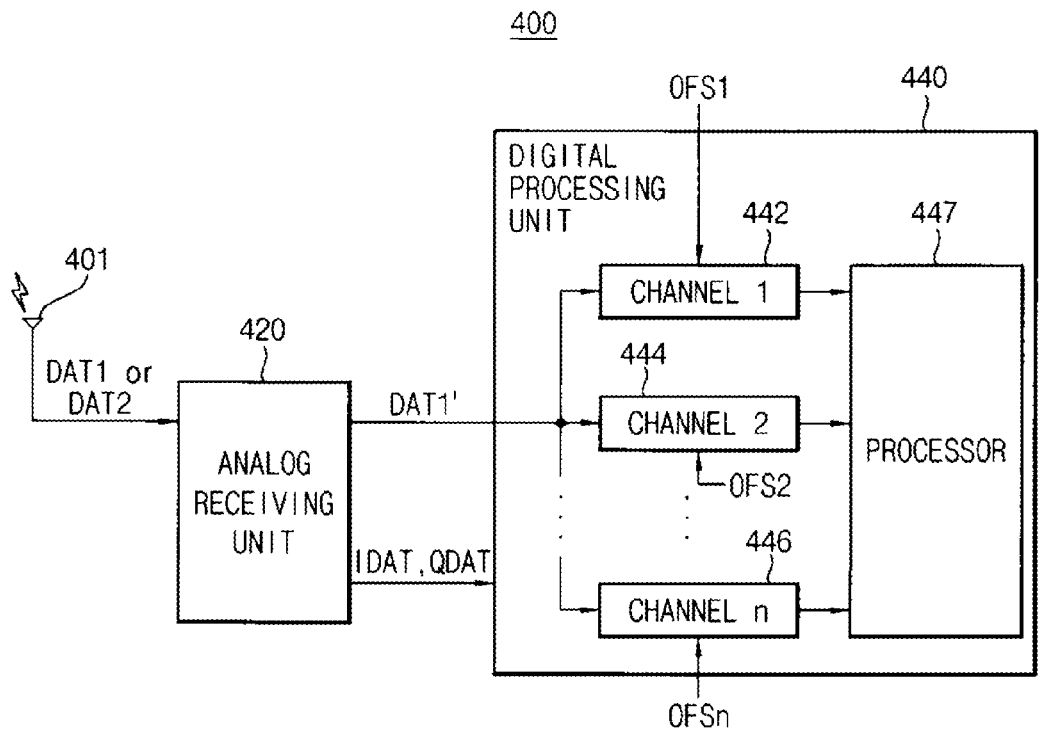
FIG. 12 is a block diagram illustrating a data receiver for NFC according to example embodiments.

FIG. 12 is a block diagram illustrating a data receiver for NFC according to example embodiments.

Referring to FIG. 12, the data receiver 400 for NFC includes an analog receiving unit 420 and a digital processing unit 440.

The analog receiving unit 420 outputs the received first data DAT1' through the antenna 401. In the first operation mode, the analog receiving unit 420 outputs the received first data DAT1' based on the first data DAT1. In addition, in the second operation mode, the analog receiving unit 420 outputs the in-phase data IDAT and quadrature-phase data QDAT based on the second data DAT2.

The digital processing unit 440 includes n channels 442, 444 and 446 (n is an integer of 3 or more) to process the received first data DAT1' at the substantially same time and a processor 447 for processing and storing outputs of the channels 442, 444 and 446. The digital processing unit 440 determines the sampling characteristic of the first channel 442 based on the first offset value OFS1, the sampling characteristic of the second channel 444 based on the second offset value OFS2, and the sampling characteristic of the $n^{th}$ channel 446 based on the $n^{th}$ offset value OFSn. The digital processing unit 440 detects the communication protocol of the received first data DAT1' based on the first to $n^{th}$ channels 442, 444 and 446 and decodes and stores the received first data DAT1' based on the detected communication protocol. Only one of the first to $n^{th}$ channels 442, 444 and 446 may be activated based on the result of the communication protocol detecting operation and the communication protocol of the received first data DAT1' may be detected based on the channel having the higher priority when at least two of the first to $n^{th}$ channels 442, 444 and 446 have the detectable waveforms.

In one example embodiment, as described above with reference to FIGS. 5, 9 and 10, some of the channels 442, 444 and 446 may be implemented by using sampling blocks included in the data receiver for NFC according to the related art. In another example embodiment, all of the channels 442, 444 and 446 may be implemented by adding new sampling blocks as described above with reference to FIGS. 7 and 11.

Figure 13:
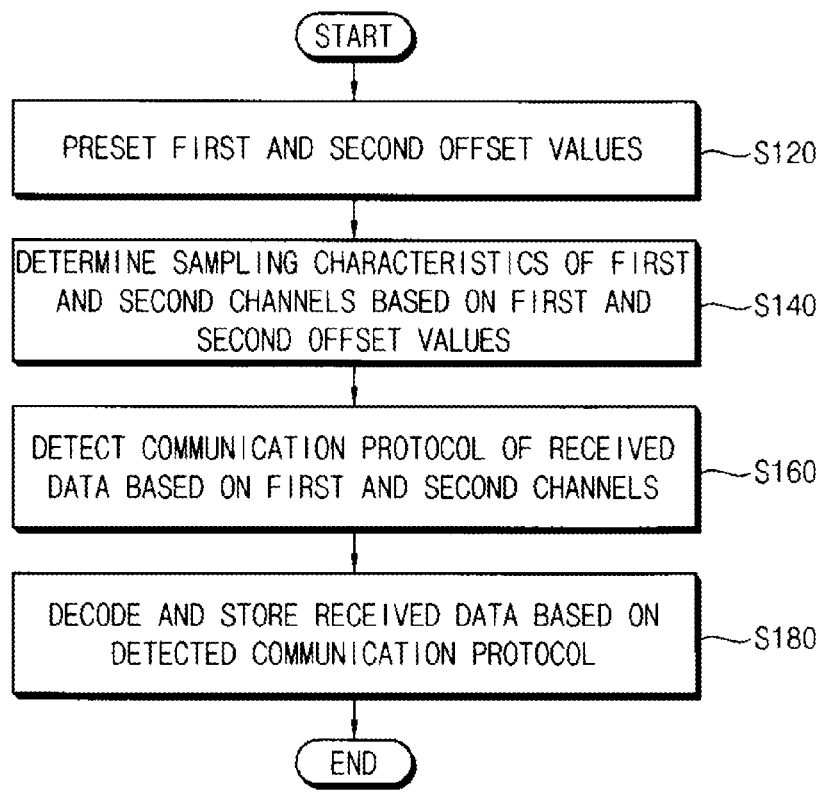
FIG. 13 is a flowchart illustrating a method of receiving data for NFC according to example embodiments.

FIG. 13 is a flowchart illustrating a method of receiving data for NFC according to example embodiments.

Referring to FIGS. 1 and 13, in the method of receiving data for NFC according to example embodiments, first and second offset values OFS1 and OFS2 are set (or, alternatively preset) (step S120). For instance, the first offset value OFS1 and the second offset value OFS2 may be preset such that the TypeA 106 protocol can be distinguished from the TypeF 212 protocol, and the first offset value OFS1 may be greater than the second offset value OFS2.

Then, the sampling characteristics of the first and second channels 142 and 144 are determined based on the first offset value OFS1 and the second offset value OFS2 (step S140), and the communication protocol of the data DAT1' received from an external reader (not shown) in the first operation mode are detected based on the first and second channels 142 and 144 (step S160). For instance, the received data DAT1' may be sampled by using two channels 142 and 144 at the substantially same time and the communication protocol of the received data DAT1' can be detected based on the sampling result. Then, the received data DAT1' are decoded and stored based on the detected communication protocol (step S180).

Figure 14:
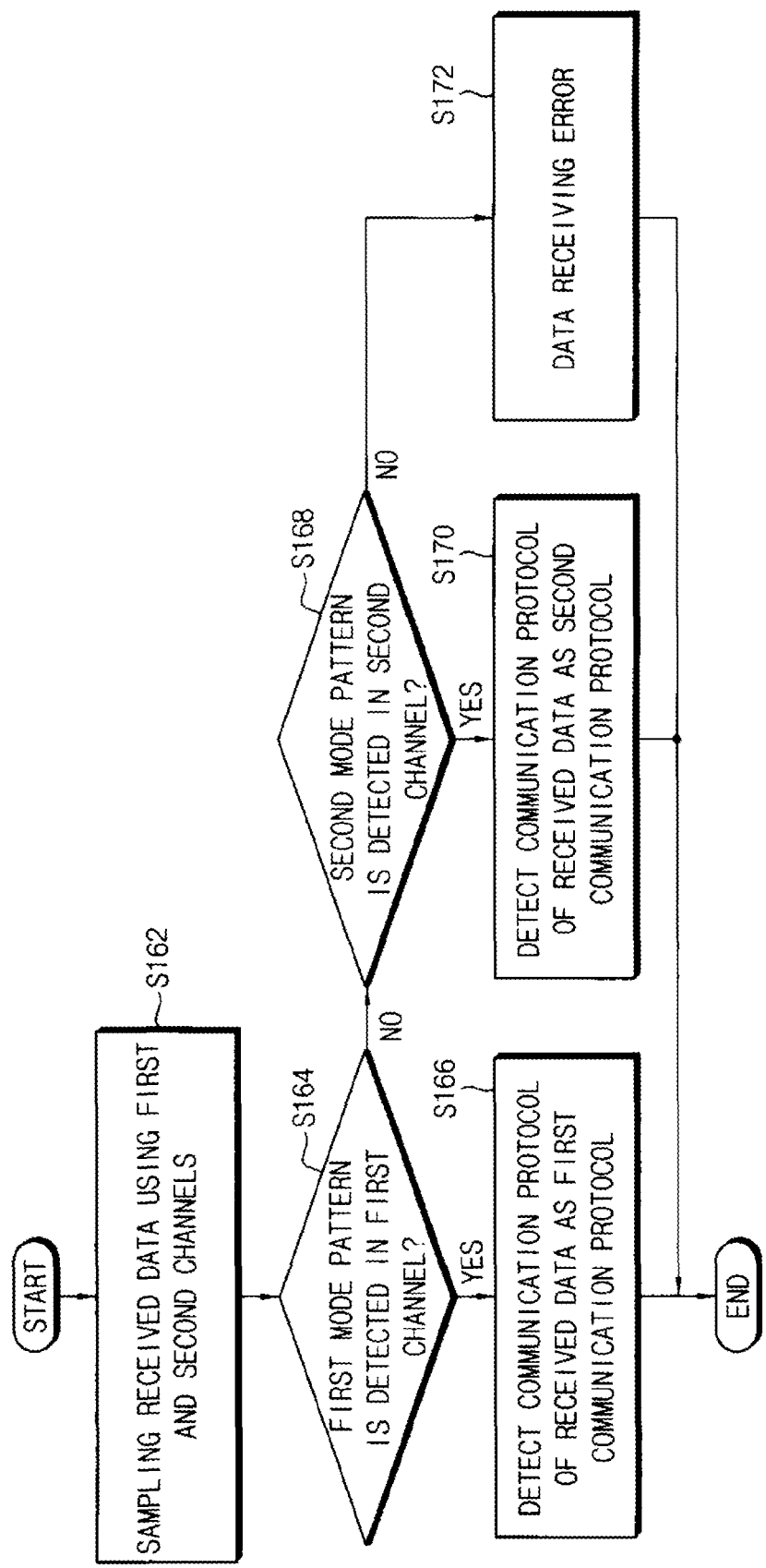
FIG. 14 is a flowchart illustrating an example of a step of detecting a communication protocol of received data shown in FIG. 13.

FIG. 14 is a flowchart illustrating an example of a step of detecting the communication protocol of the received data shown in FIG. 13.

Referring to FIGS. 1, 13 and 14, when detecting the communication protocol of the received data DAT1' (step S160), the received data DAT1' are sampled by using the first channel 142, and at the same time, the received data DAT1' are sampled by using the second channel 144 (step S162).

After that, it is determined whether a first mode pattern is detected in the first channel 142 (step S164) and a second mode pattern is detected in the second channel 144 (step S168) based on the sampling result for the received data DAT1'. For instance, the first and second offset values OFS1 and OFS2 may be preset such that the first channel 142 has the priority higher than that of the second channel 144, so step S164 may be performed prior to step S168. According to example embodiments, the priority of the channels 142 and 144 may be interchanged, so the sequence of step S164 and step S168 may be interchanged.

If the first mode pattern is detected in the first channel 142 (step S164: Yes), the communication protocol of the received data DAT1' is detected as the first communication protocol (step S166). For instance, the first communication protocol may be the TypeA 106 protocol or the TypeB 106 protocol and the first mode pattern may correspond to the start bit 211 (see FIG. 2) or the file start pattern 221 (see FIG. 2).

In the case that the first mode pattern is not detected in the first channel 142 and the second mode pattern is detected in the second channel 144 (step S164: No and step S168: Yes), the communication protocol of the received data DAT1' is detected as the second communication protocol (step S170). For instance, the second communication protocol may be the TypeF 212 protocol or the TypeF 424 protocol and the second mode pattern may correspond to the sync pattern 232 (see FIG. 2).

In the case that the first mode pattern is not detected in the first channel 142 and the second mode pattern is not detected in the second channel 144 (step S164: No and step S168: No), it is determined as the data receiving error (step S172). In this case, the received data DAT1' may be sampled again or the data re-transmission may be requested.

Figure 15:
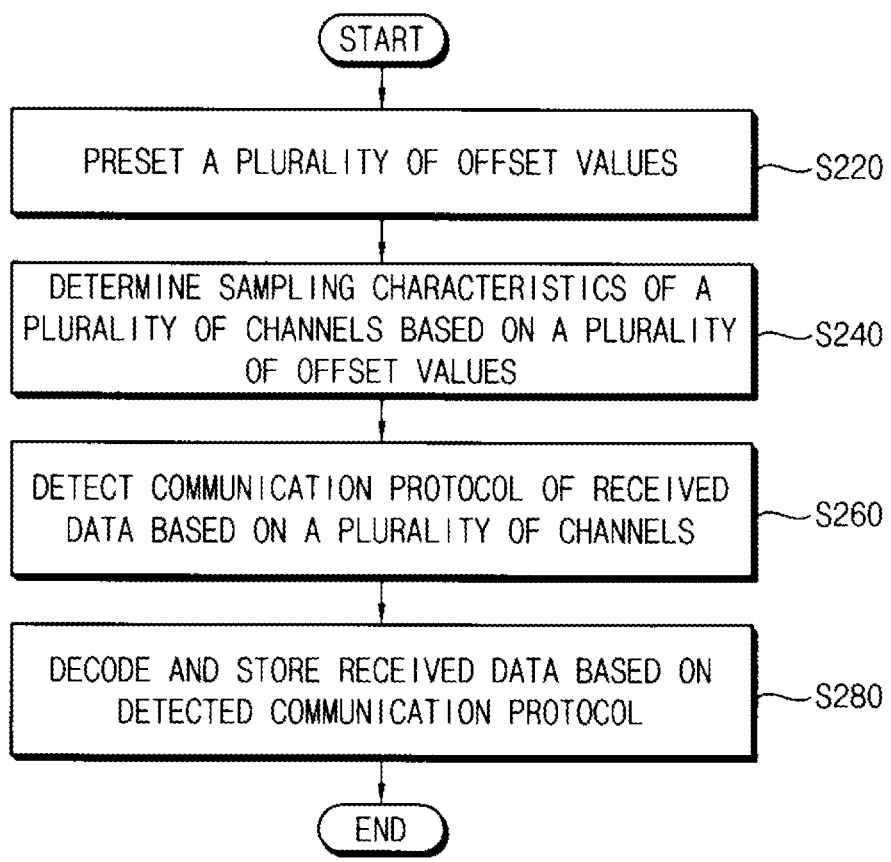
FIG. 15 is a flowchart illustrating a method of receiving data for NFC according to example embodiments.

FIG. 15 is a flowchart illustrating a method of receiving data for NFC according to example embodiments.

Referring to FIGS. 12 and 15, in the method of receiving data for NFC according to example embodiments, a plurality of offset values OFS1, OFS2, . . . , and OFSn are preset (step S220), the sampling characteristics of the channels 424, 444 and 446 are determined based on the offset values OFS1, OFS2, and OFSn (step S240), the communication protocol of the data DAT1' received from an external reader (not shown) in the first operation mode is detected based on the channels 424, 444 and 446 (step S260), and the received data DAT1' are decoded and stored based on the detected communication protocol (step S280).

Figure 16:
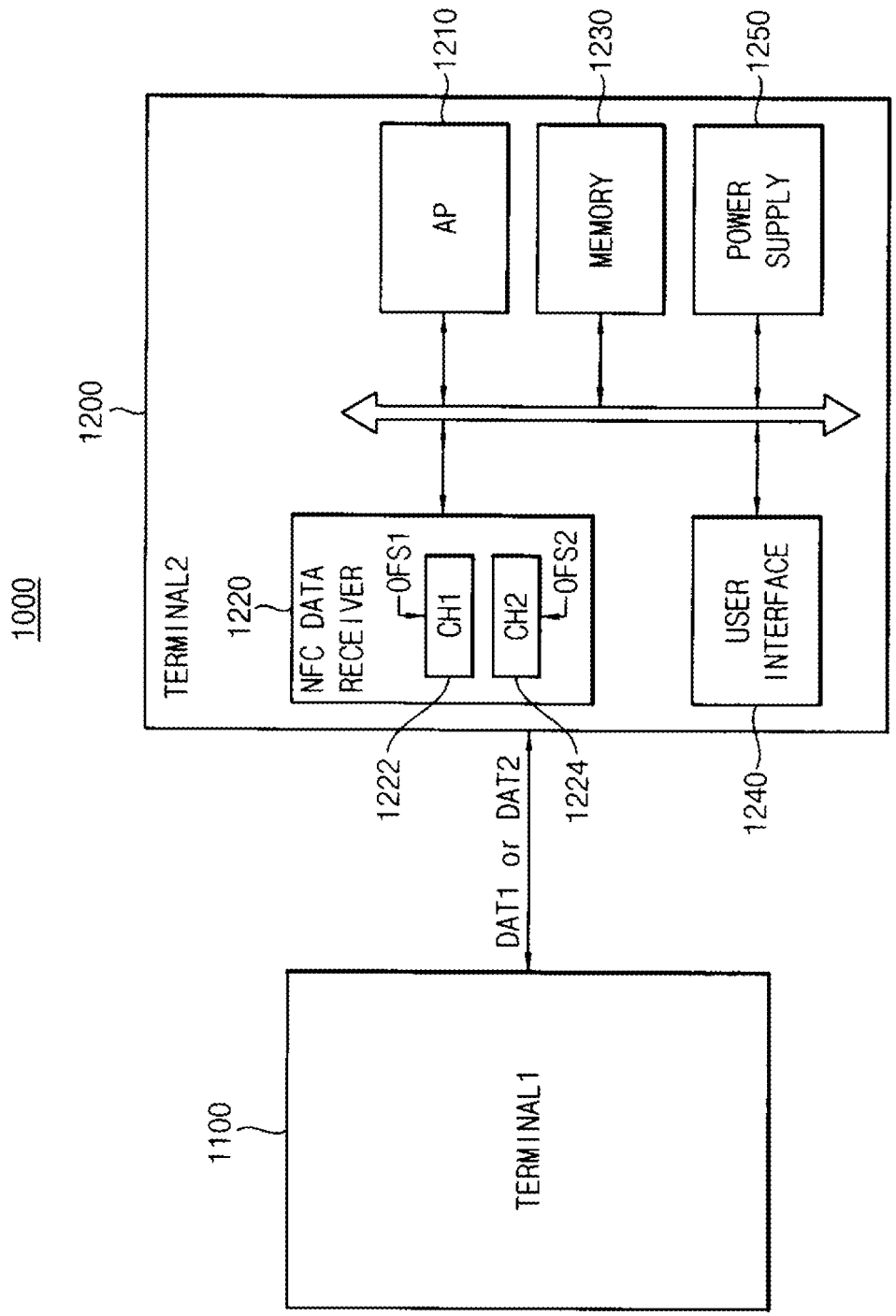
FIG. 16 is a block diagram illustrating a wireless communication system according to example embodiments.
Figure 17:
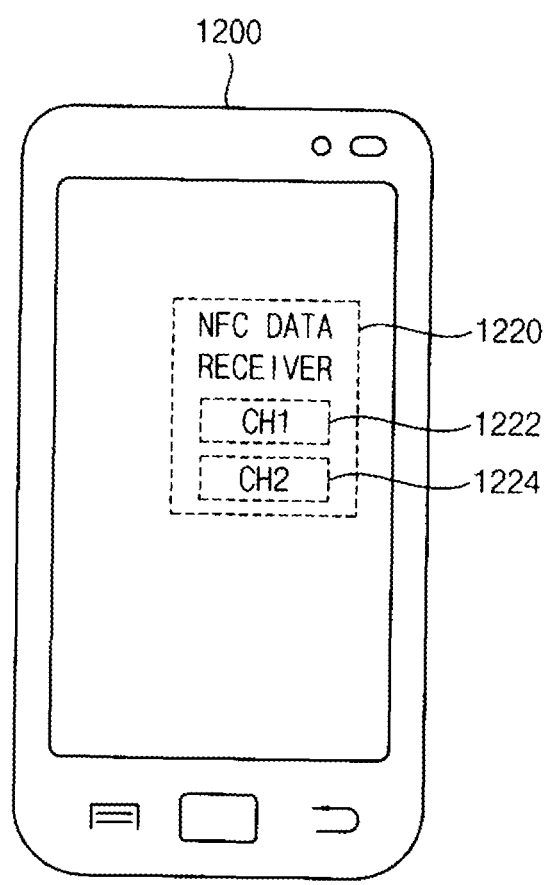
FIG. 17 is a view illustrating an example of a second terminal included in the wireless communication system shown in FIG. 16.

FIG. 16 is a block diagram illustrating a wireless communication system according to example embodiments. FIG. 17 is a view illustrating an example of a second terminal included in the wireless communication system shown in FIG. 16.

Referring to FIGS. 16 and 17, the wireless communication system 1000 includes a first terminal 1100 and a second terminal 1200.

The first terminal 1100 transmits the first data DAT1 or the second data DAT2 according to the operation mode. For instance, the first terminal 1100 may transmit the first data DAT1 in the first operation mode. At this time, the first terminal 1100 may serve as a reader (or initiator) and the second terminal 1200 may serve as a card (or target). The first terminal 1100 may transmit the second data DAT2 in the second operation mode. At this time, the first terminal 1100 may serve as a card (or target) and the second terminal 1200 may serve as a reader (or initiator).

The second terminal 1200 receives the first data DAT1 or the second data DAT2 transmitted from the first terminal 1100. The second terminal 1200 includes a data receiver 1220 for NFC and may further include an application processor 1210, a memory device 1230, a user interface 1240 and a power supply 1240.

In one example embodiment, the second terminal 1200 may be a mobile device. For example, the second terminal 1200 may be any mobile system, such as a mobile phone, a smart phone, a tablet computer, a laptop computer, a PDA, a PMP, a digital camera, a portable game console, a music player, a camcorder, a video player, a navigation system, etc.

The application processor 1210 may execute the operating system (OS) to drive the second terminal 1200. In addition, the application processor 1210 may execute applications, such as an internet browser, a game application, a video player application, etc. According to example embodiments, the application processor 1210 may include a single processor core or a plurality of processor cores. In some embodiments, the application processor 1210 may further include a cache memory located inside or outside the application processor 1210.

The memory device 1230 may store data processed by the application processor 1210 and may serve as a working memory. In addition, the memory device 1230 may store a boot image for booting the second terminal 1200, a file system associated with the OS, a device driver associated with an external device (not shown) connected to the second terminal 1200, an application program executed by the second terminal 1200, etc. For example, the memory device 1230 may include a volatile memory, e.g., a DRAM, a SRAM, a mobile DRAM, or a nonvolatile memory, e.g., an electrically erasable programmable read-only memory (EEPROM), a flash memory, a PRAM, a RRAM, a MRAM, a FRAM, a nano floating gate memory (NFGM), a polymer random access memory (PoRAM).

The user interface 1240 may include at least one input device, such as a keypad or a touch screen, and/or at least one output device, such as a speaker or a display device. The power supply 1250 may supply operating power to the second terminal 1200. In addition, the second terminal 1200 may further include a baseband chipset, an image sensor, etc.

The data receiver 1220 for NFC may be identical to the data receiver 100 for NFC shown in FIG. 1. The data receiver 1220 for NFC includes an analog receiving unit and a digital processing unit. The analog receiving unit receives and outputs the first data DAT1 in the first operation mode and receives the second data DAT2 in the second operation mode to output the in-phase data and the quadrature-phase data based on the second data DAT2. The digital processing unit determines the sampling characteristic of a first channel 1222 based on a first offset value OFS1 and determines the sampling characteristic of the second channel 1224 based on a second offset value OFS2. In the first operation mode, the digital processing unit detects the communication protocols of the received first data based on the first and second channels 1222 and 1224 and decodes and store the received first data based on the detected communication protocols of the received first data. The data receiver 1220 for NFC processes the received first data in the substantially same time by using two channels 1222 and 1224 having mutually different sampling characteristics, so the communication protocol of the received first data can be rapidly and accurately detected and the data receiving performance can be improved in the auto receiving operation.

According to example embodiments, as shown in FIGS. 8 to 12, the data receiver 1220 for NFC may include at least three channels to process the received first data at the substantially same time.

According to example embodiments, the second terminal 1200 and/or components of the second terminal 1200 may be packaged in various forms, such as package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Although not shown in the drawings, the wireless communication system 1000 for NFC is a bidirectional communication system capable of performing the data reading and data writing operations, so the first terminal 1100 may also include the data receiver for NFC according to example embodiments. The first terminal 1100 may further include components, such as a processor, a memory device, a user interface and a power supply.

Example embodiments can be applied to the terminal for NFC and the wireless communication system including the same. For instance, example embodiments can be applied to various terminals, such as a mobile phone, a smart phone, a tablet PC, a laptop computer, a personal digital assistant (PDA), a portable multimedia player (PMP), a digital camera, a music player, a portable game console and a navigation.

The foregoing is illustrative of example embodiments and is not to be construed as limiting thereof Although a few example embodiments have been described, those skilled in the art will readily appreciate that many modifications are possible in the example embodiments without materially departing from the novel teachings and advantages of the inventive concepts. Accordingly, all such modifications are intended to be included within the scope of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A data receiver for near field communication (NFC), the data receiver comprising:

an analog receiving unit configured to output one of received first data and modified received second data according to an operation mode, the modified received second data being in-phase data and quadrature-phase data generated based on received second data; and a digital processing unit configured to,
determine a sampling characteristic of a first channel based on a first offset value,
determine a sampling characteristic of a second channel based on a second offset value,
detect a communication protocol of the received first data based on the first and second channels, and
decode and store the received first data based on the detected communication protocol of the received first data.

2. The data receiver of claim 1, wherein the digital processing unit is configured to,
detect the communication protocol of the received first data based on the first channel when the received first data corresponds to a first communication protocol,
detect the communication protocol of the received first data based on the second channel when the received first data corresponds to a second communication protocol, and
deactivate one of the first and second channels based on which communication protocol the digital processing unit detects.

3. The data receiver of claim 2, wherein the first communication protocol is one of a TypeA 106 protocol and a TypeB 106 protocol, and the second communication protocol is one of a TypeF 212 protocol and a TypeF 424 protocol.

4. The data receiver of claim 3, wherein the digital processing unit has the first and second offset values preset such that the digital processing unit is configured to distinguish the TypeA 106 protocol from the TypeF 212 protocol.

5. The data receiver of claim 4, wherein the first offset value is greater than the second offset value.

6. The data receiver of claim 3, wherein the received first data includes a mode pattern and a data pattern, and wherein the digital processing unit is configured to detect the communication protocol of the received first data by analyzing the mode pattern using the first and second channels.

7. The data receiver of claim 6, wherein the mode pattern corresponds to,
a start bit when the received first data corresponds to the TypeA 106 protocol,
a file start pattern when the received first data corresponds to the TypeB 106 protocol, and
a sync pattern when the received first data corresponds to the TypeF 212 protocol or the TypeF 424 protocol.

8. The data receiver of claim 7, wherein, when the received first data corresponds to the TypeA 106 protocol, the digital processing unit is configured to detect the communication protocol of the received first data by analyzing 1 bit of the data pattern received after the start bit.

9. The data receiver of claim 1, wherein the digital processing unit comprises:
a first sampling block configured to generate a first detection signal and a first internal data signal based on the received first data and the first offset value if the received first data corresponds to a first communication protocol in a first operation mode;
a second sampling block configured to generate a second detection signal and a second internal data signal based on the received first data and the second offset value if the received first data corresponds to a second communication protocol in the first operation mode; and
a decoding block configured to decode and store the received first data based on the first detection signal, the first internal data signal, the second detection signal and the second internal data signal in the first operation mode.

10. The data receiver of claim 9, wherein the digital processing unit further comprises:
a selecting block configured to provide one of the received first data and the quadrature-phase data to the second sampling block according to the operation mode; and
a third sampling block configured to generate a third internal data signal based on the in-phase data in a second operation mode, and wherein
the second sampling block is configured to generate a fourth internal data signal based on the quadrature-phase data in the second operation mode, and the decoding block is configured to decode and store the received second data based on the third internal data signal and the fourth internal data signal in the second operation mode.

11. The data receiver of claim 9, wherein the digital processing unit further comprises:
a third sampling block configured to generate a third internal data signal based on the in-phase data in a second operation mode; and
a fourth sampling block configured to generate a fourth internal data signal based on the quadrature-phase data in the second operation mode, and wherein
the decoding block is configured to decode and store the received second data based on the third internal data signal and the fourth internal data signal in the second operation mode.

12. The data receiver of claim 9, wherein the first sampling block is configured to serve as the first channel and the second sampling block is configured to serve as the second channel.

13. The data receiver of claim 1, wherein the first and second offset values include priority information representing a priority of the detected communication protocol, and
the digital processing unit is configured to detect the communication protocol using one of the first and second channels having a higher priority when the received first data have waveforms that are detectable by both of the first and second channels.

14. The data receiver of claim 1, wherein the analog receiving unit comprises:
a first receiving block configured to receive and output the received first data; and
a second receiving block configured to output the in-phase data and the quadrature-phase data based on the received second data.

15. A wireless communication system, comprising:
a first terminal configured to transmit one of first data and second data according to an operation mode; and
a second terminal configured to receive the one of the first data and the second data transmitted from the first terminal, wherein
the second terminal includes a data receiver for near field communication (NFC), and
the data receiver includes,
an analog receiving unit configured to output one of the first data and modified second data according to the operation mode, the modified second data being in-phase data and quadrature-phase data generated based on the second data; and
a digital processing unit configured to,
determine a sampling characteristic of a first channel based on a first offset value,
determine a sampling characteristic of a second channel based on a second offset value,
detect a communication protocol of the received first data based on the first and second channels, and
decode and store the received first data based on the detected communication protocol of the first data.

16. A data receiver comprising:
a digital processing unit including a first channel and a second channel, the first channel configured to receive first data, the second channel configured to receive second data, the second data being in-phase data and quadrature-phase data, the in-phase data being data that is in phase with incoming data received by an analog receiving unit and the quadrature-phase data being data that is 90 degrees out of phase with the incoming data, the digital processing unit configured to,
detect a communication protocol of the incoming data using the first channel and the second channel, and
decode the incoming data based on the detected communication protocol.

17. The data receiver of claim 16, wherein the incoming data includes a mode pattern and a data pattern, and the digital processing unit is configured to the detect the communication protocol by analyzing the mode pattern using the first channel and the second channel.

18. The data receiver of claim 16, wherein the first channel is configured to generate first detection signals by sampling the first data at a frequency determined using a first offset and the second channel is configured to generate second detection signals by sampling one of the first data and the quadrature-phase data at a frequency determined using a second offset, and the digital processing unit further includes a decoding block configured to decode the incoming data based on the first detection signals and the second detection signals, the first offset being different than the second offset.

19. The data receiver of claim 16, wherein digital processing unit is configured to deactivate one of the first and second channels that is not associated with the detected communication protocol.

20. The data receiver of claim 16, wherein the data receiver includes the analog receiving unit and the analog receiving unit comprises:
a first receiving block configured to receive the incoming data and output the first data to the first channel and the second channel; and
a second receiving block configured to receive the incoming data and output the in-phase data to a third channel and the quadrature-phase data to the second channel.

* * * * *